United States Patent
Yamamoto

(10) Patent No.: US 9,405,374 B2
(45) Date of Patent: Aug. 2, 2016

(54) INFORMATION PROCESSING APPARATUS OPERABLE IN RESPONSE TO TOUCH OPERATION

(71) Applicant: CANON KABUSHIKI KAISHA, Tokyo (JP)

(72) Inventor: Keiichi Yamamoto, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 14/022,787

(22) Filed: Sep. 10, 2013

(65) Prior Publication Data

US 2014/0071075 A1    Mar. 13, 2014

(30) Foreign Application Priority Data

Sep. 13, 2012 (JP) ................................. 2012-201684

(51) Int. Cl.
  *G06F 3/01* (2006.01)
  *G06F 3/0488* (2013.01)
  *G06F 3/0484* (2013.01)

(52) U.S. Cl.
  CPC .............. *G06F 3/017* (2013.01); *G06F 3/0488* (2013.01); *G06F 3/04847* (2013.01)

(58) Field of Classification Search
  CPC combination set(s) only.
  See application file for complete search history.

(56) References Cited

U.S. PATENT DOCUMENTS

| 2010/0188352 A1* | 7/2010 | Ikeda | G06F 3/0486 345/173 |
| 2011/0157048 A1* | 6/2011 | Nakatani | G06F 3/0418 345/173 |
| 2013/0088521 A1* | 4/2013 | Katou | G09G 5/34 345/684 |

FOREIGN PATENT DOCUMENTS

JP    10-161628 A    6/1998

* cited by examiner

*Primary Examiner* — Gerald Johnson
*Assistant Examiner* — Robert Michaud
(74) *Attorney, Agent, or Firm* — Canon USA Inc. IP Division

(57) ABSTRACT

An information processing apparatus includes a determination unit configured to determine a moving speed of an image displayed on the display screen based on information relating to the movement of the touch position acquired, wherein the determination unit determines, if a plurality of pieces of information relating to a sequential movement of the touch position in the touch operation are acquired, whether to reflect each of the plurality of pieces of information relating to the sequential movement of the touch position on the moving speed of the image displayed on the display screen, and further determines the moving speed of the image displayed on the display screen based on information determined as being reflected on the movement of the image displayed on the display screen.

11 Claims, 11 Drawing Sheets

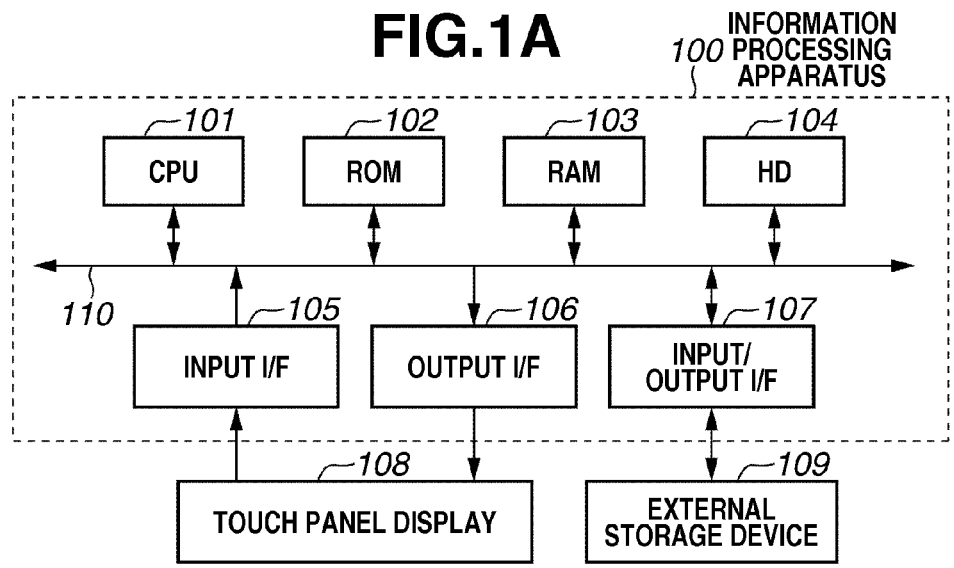
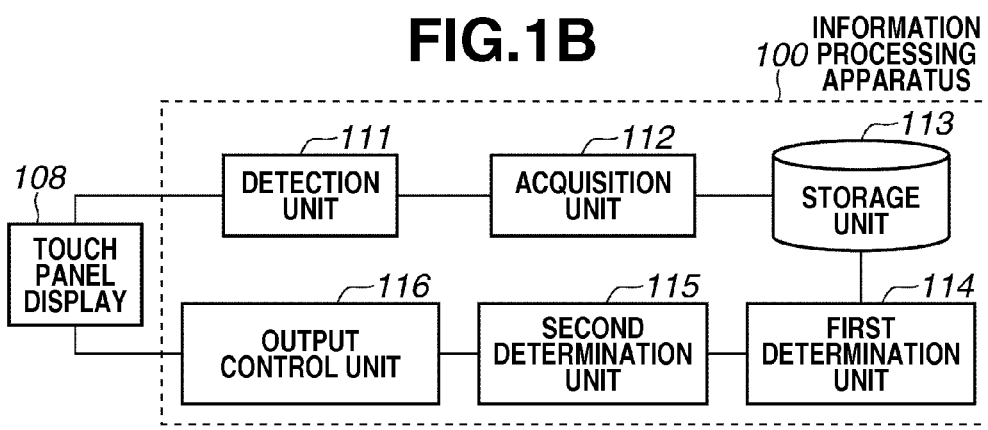
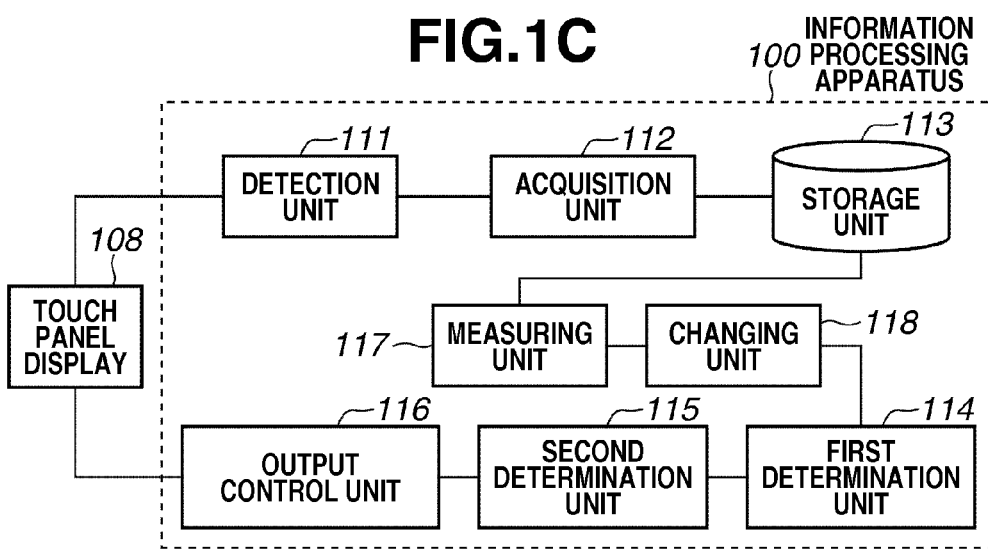

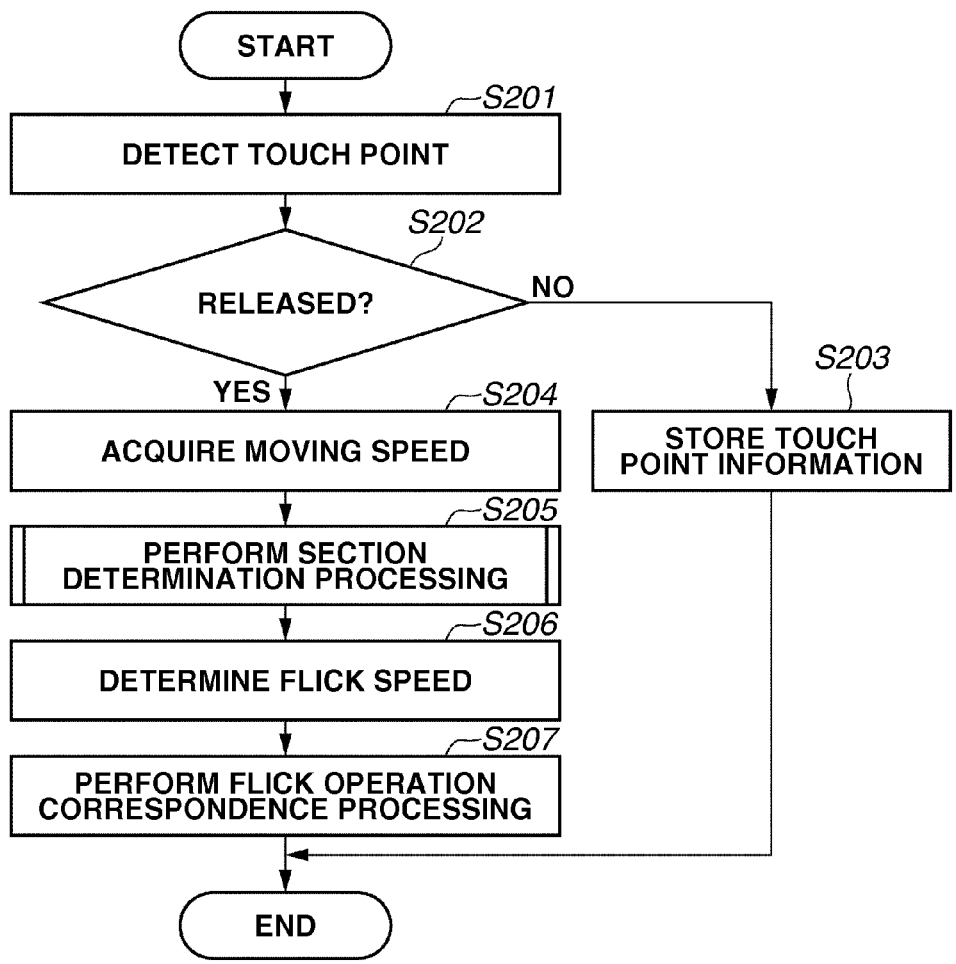

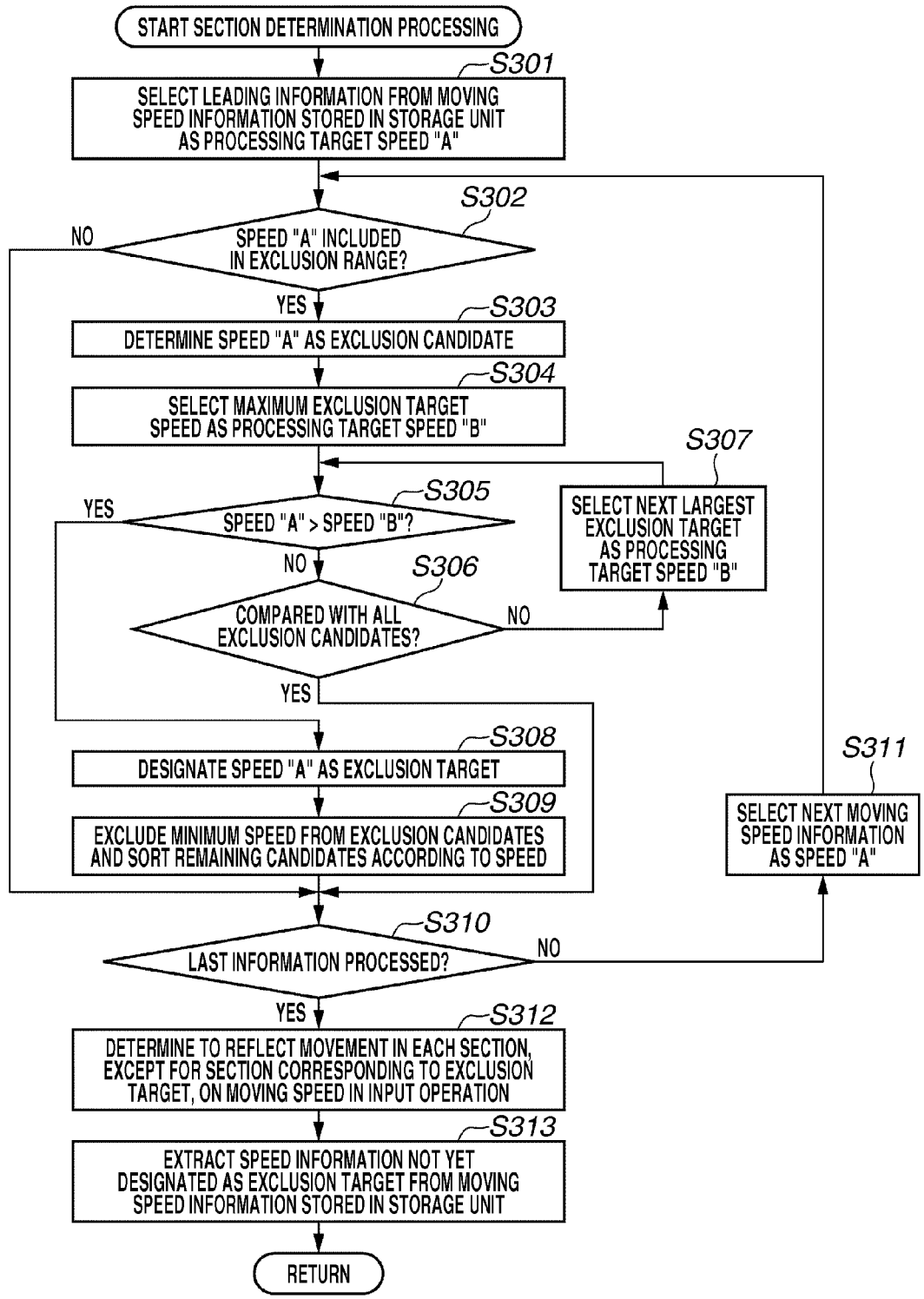

FIG.4A
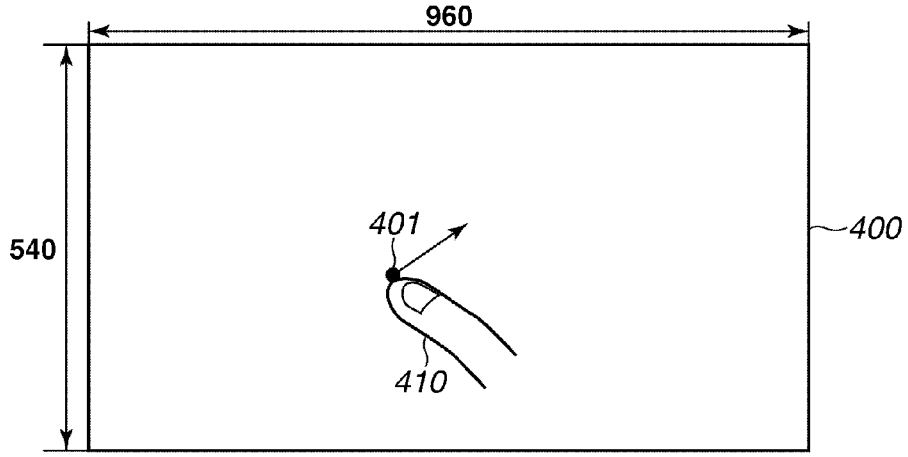
FIG.4B
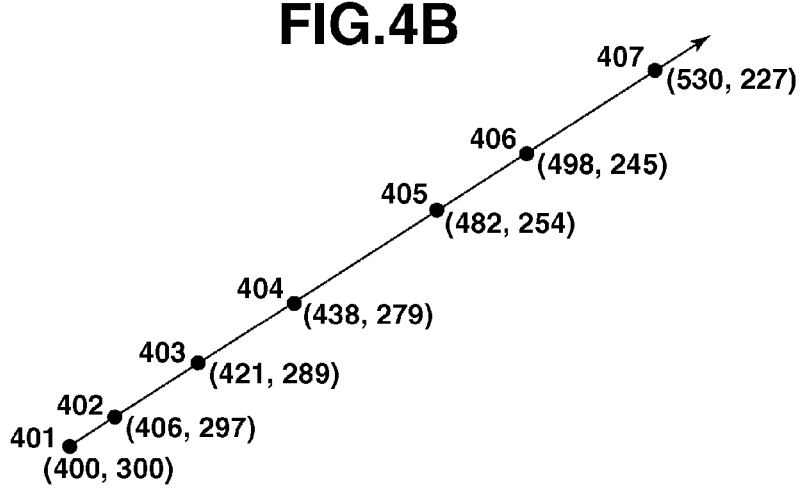
FIG.4C
| REFERENCE NUMERAL | X COORDINATE [dot] | MOVING DISTANCE [dot] | MOVING TIME [ms] | MOVING SPEED [dot/s] | EXCLUSION |
|---|---|---|---|---|---|
| 402 | 406 | 15 | 20 | 750 | |
| 403 | 421 | 17 | 20 | 850 | ○ |
| 404 | 438 | 17 | 20 | 850 | ○ |
| 405 | 482 | 44 | 20 | 2200 | ○ |
| 406 | 498 | 16 | 20 | 800 | |
| 407 | 530 | 32 | 20 | 1600 | ○ |
| | | | FLICK SPEED | 775 | |

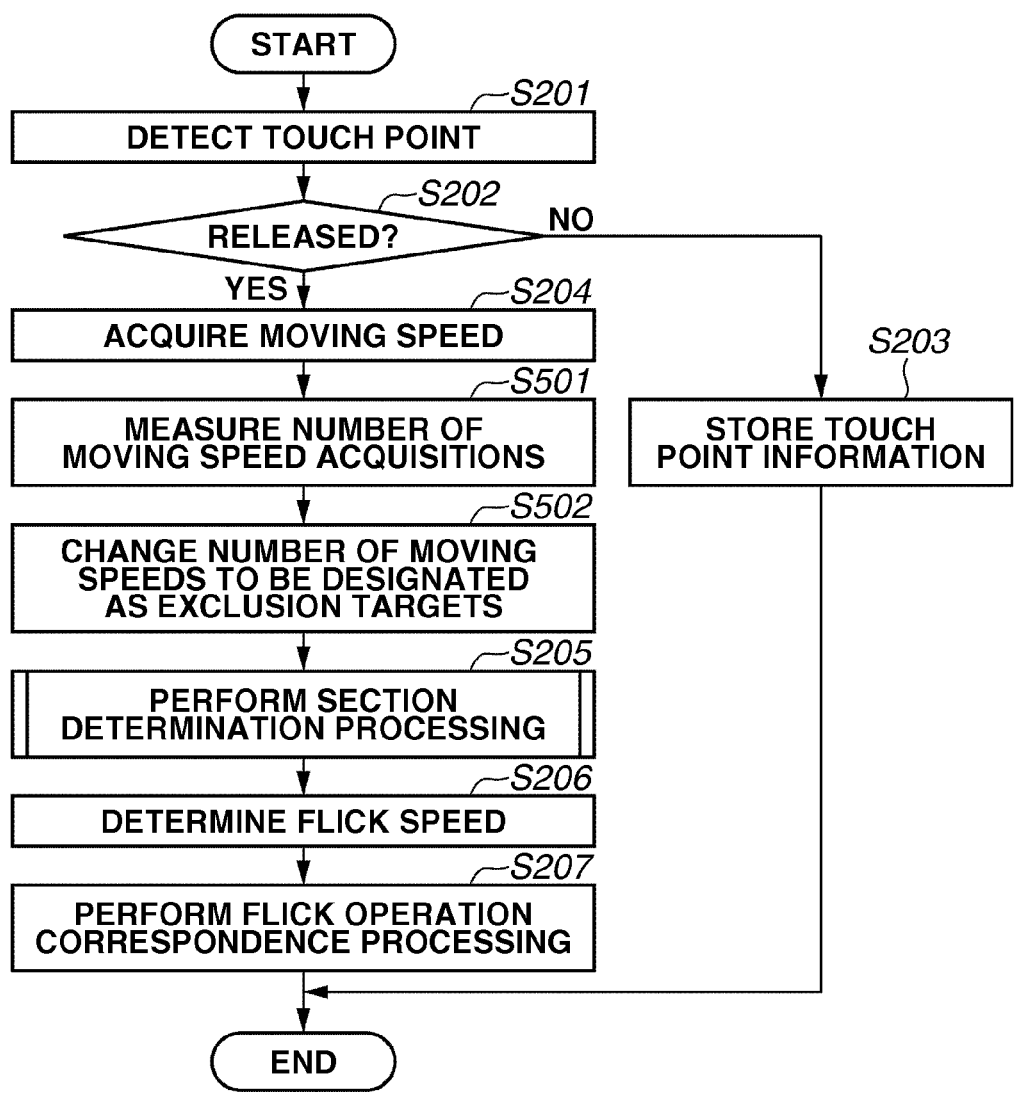

FIG.6A
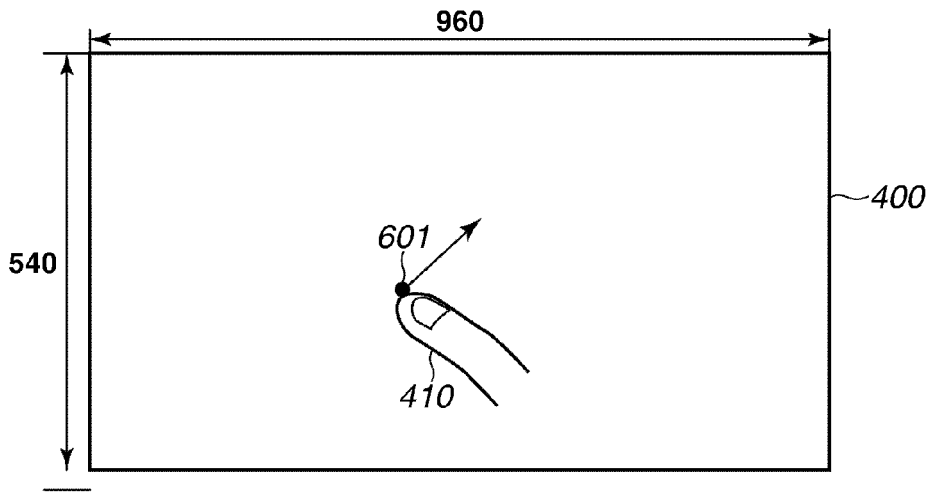
FIG.6B
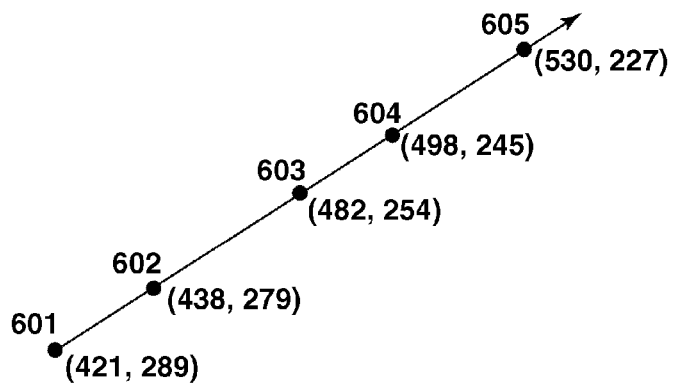
FIG.6C
| REFERENCE NUMERAL | X COORDINATE [dot] | MOVING DISTANCE [dot] | MOVING TIME [ms] | MOVING SPEED [dot/s] | EXCLUSION |
|---|---|---|---|---|---|
| 601 | 421 | 17 | 20 | 850 | |
| 602 | 438 | 44 | 20 | 2200 | O |
| 603 | 482 | 16 | 20 | 800 | |
| 604 | 498 | 32 | 20 | 1600 | O |
| 605 | 530 | | | | |
| | | | FLICK SPEED | 825 | |

FIG.8A
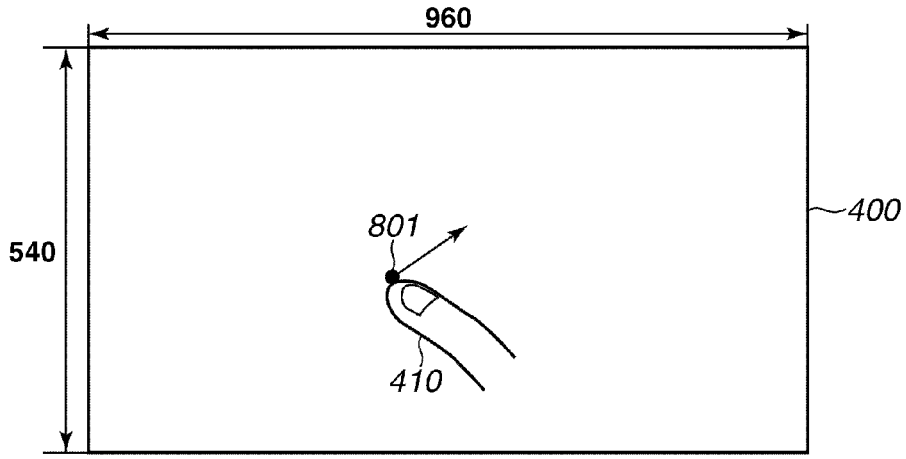
FIG.8B
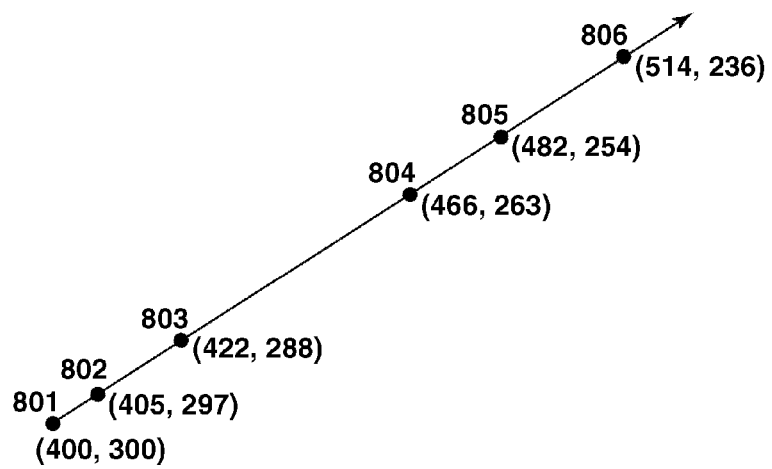
FIG.8C
| REFERENCE NUMERAL | X COORDINATE [dot] | MOVING DISTANCE [dot] | MOVING TIME [ms] | MOVING SPEED [dot/s] | EXCLUSION |
|---|---|---|---|---|---|
| 801 | 400 | 5 | 20 | 250 | ○ |
| 802 | 405 | 17 | 20 | 850 | |
| 803 | 422 | | | | |
| 804 | 466 | 44 | 20 | 2200 | ○ |
| 805 | 482 | 16 | 20 | 800 | |
| 806 | 514 | 32 | 20 | 1600 | ○ |
| | | | FLICK SPEED | 825 | |

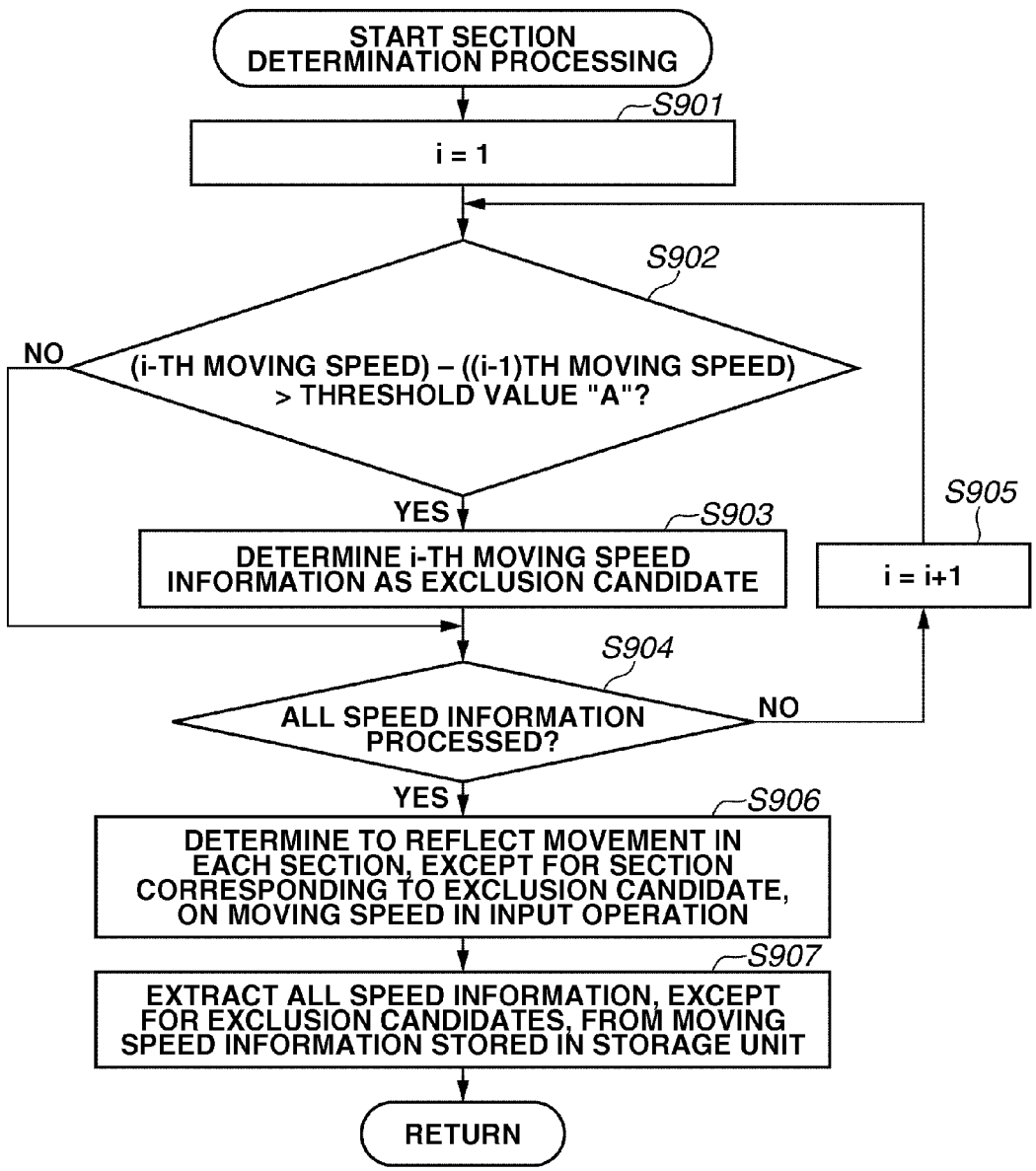

| REFERENCE NUMERAL | X COORDINATE [dot] | MOVING DISTANCE [dot] | MOVING TIME [ms] | MOVING SPEED [dot/s] | INCREMENT AMOUNT [dot/s] | EXCLUSION |
|---|---|---|---|---|---|---|
| 402 | 406 | | | | | |
| 403 | 421 | 15 | 20 | 750 | — | |
| 404 | 438 | 17 | 20 | 850 | 100 | |
| 405 | 482 | 44 | 20 | 2200 | 1350 | ○ |
| 406 | 498 | 16 | 20 | 800 | -1400 | |
| 407 | 530 | 32 | 20 | 1600 | 800 | ○ |
| | | | | FLICK SPEED | 800 | |

| REFERENCE NUMERAL | X COORDINATE [dot] | MOVING DISTANCE [dot] | MOVING TIME [ms] | MOVING SPEED [dot/s] | SPEED DIFFERENCE RELATIVE TO MEAN SPEED [dot/s] | EXCLUSION |
|---|---|---|---|---|---|---|
| 402 | 406 | | | | | |
| 403 | 421 | 15 | 20 | 750 | -490 | |
| 404 | 438 | 17 | 20 | 850 | -390 | |
| 405 | 482 | 44 | 20 | 2200 | 960 | ○ |
| 406 | 498 | 16 | 20 | 800 | -440 | |
| 407 | 530 | 32 | 20 | 1600 | 360 | ○ |
| | | | MEAN SPEED | 1240 | | |
| | | | FLICK SPEED | 800 | | |

INFORMATION PROCESSING APPARATUS OPERABLE IN RESPONSE TO TOUCH OPERATION

BACKGROUND OF THE INVENTION

1. Field of the Invention

The present disclosure generally relates to information processing and, more particularly, to an information processing apparatus operable in response to a touch operation and a technique capable of recognizing a flick operation input by a user.

2. Description of the Related Art

A recent touch input device enables a user to touch a touch panel with an appropriate operation object (e.g., a finger or a stylus). The touch input device inputs X and Y coordinate values of a touched position, as input values, and performs various processing based on the input values.

Further, a user action performed in such a way as to touch an arbitrary position on the touch panel with a finger or a stylus, if it is followed by a flick-like motion while moving the finger or the stylus, is generally referred to hereinafter as a "flick operation".

As discussed in Japanese Patent Application Laid-Open No. 10-161628, it is conventionally known to scroll an image displayed on a screen based on speed (i.e., flick speed) and direction detected immediately before a user completes a flick operation by moving the operation object away from the touch panel.

In the flick operation, at the moment when the operation object (e.g., finger) becomes free from the touch panel, the operation object is released from a frictional engagement with a surface of the touch panel. Therefore, at the moment of the release of the finger from the touch panel, the moving speed of the operation object may increase compared to the speed intended by the user. In this case, if the speed detected immediately before the user moves the operation object away from the touch panel is recognized as the flick speed as discussed in Japanese Patent Application Laid-Open No. 10-161628, the recognized flick speed tends to be higher than the speed intended by the user. As a result, the moving speed (i.e., scroll speed) of an image on a display screen tends to become higher than the speed intended by the user.

SUMMARY OF THE INVENTION

The present disclosure is directed to an information processing apparatus operable in response to a touch operation and a technique capable of improving user operability in a flick operation.

Further features of the present disclosure will become apparent from the following detailed description of exemplary embodiments with reference to the attached drawings.

BRIEF DESCRIPTION OF THE DRAWINGS

FIG. 1A is a block diagram illustrating an example hardware configuration of an information processing apparatus, and FIGS. 1B and 1C are block diagrams each illustrating a functional configuration of the information processing apparatus.

FIG. 2 is a flowchart illustrating an example of flick operation recognizing processing.

FIG. 3 is a flowchart illustrating an example of section determination processing.

FIGS. 4A, 4B, and 4C illustrate an example of a series of touch points detected when a flick operation is performed.

FIGS. 5A and 5B illustrate an example of flick operation recognizing processing performed by the information processing apparatus according to a modified example.

FIGS. 6A, 6B, and 6C illustrate an example of a series of touch points detected when a flick operation is performed.

FIGS. 8A, 8B, and 8C illustrate an example of a series of touch points detected when a flick operation is performed.

FIGS. 9A and 9B are flowcharts each illustrating an example of section determination processing.

FIGS. 10A and 10B illustrate tables each indicating information about a series of touch points detected when a flick operation is performed.

DESCRIPTION OF THE EMBODIMENTS

Figure 7:
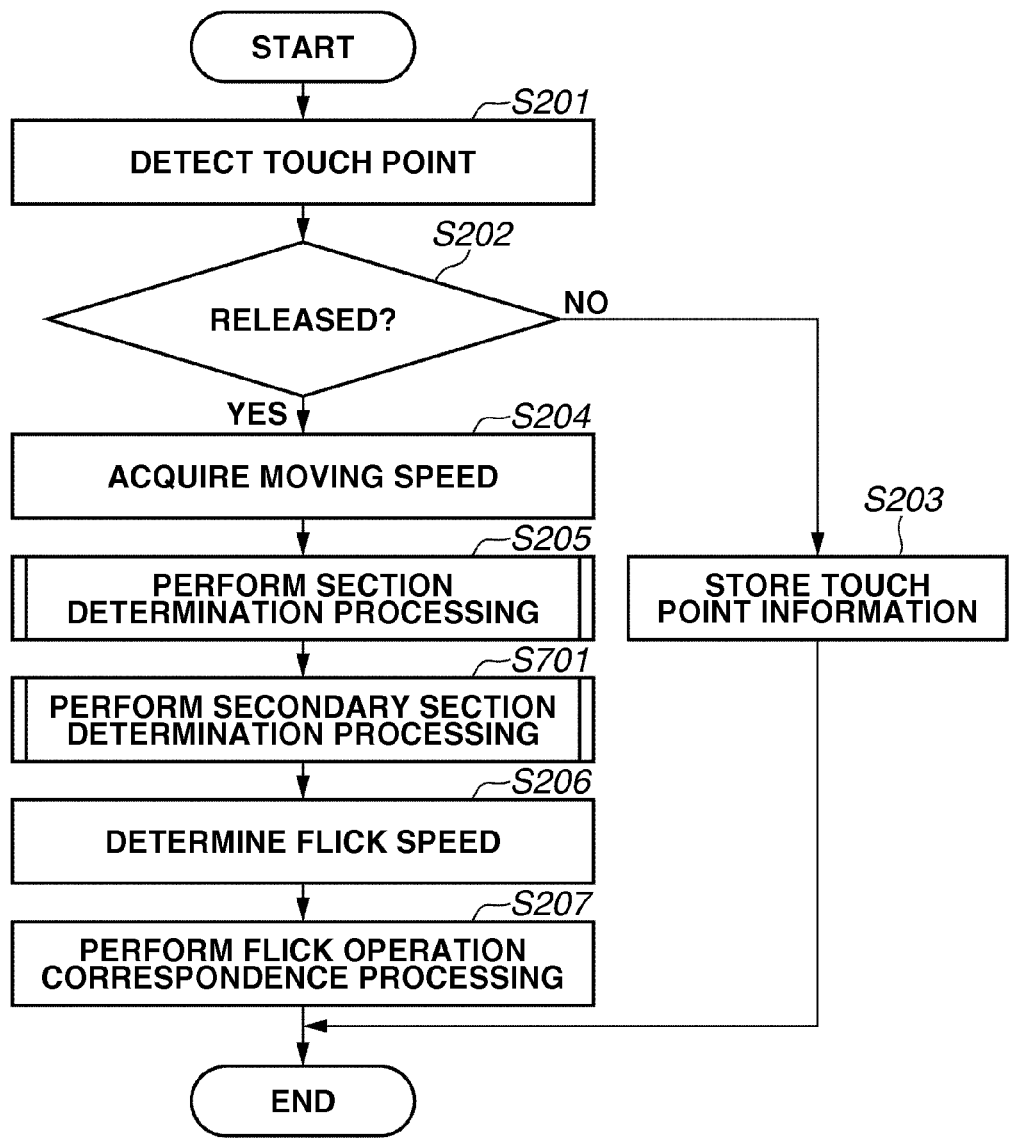
FIG. 7 is a flowchart illustrating an example of flick operation recognizing processing performed by an information processing apparatus according to a modified example.

Various exemplary embodiments, features, and aspects of the disclosure will be described in detail below with reference to the drawings. However, constituent elements described in the following exemplary embodiments are mere examples and should not be interpreted in such a way as to narrow the scope of the present disclosure.

To prevent an adverse influence of a speed change of an operation object used for a flick operation caused by a release from friction of a touch panel, an information processing apparatus according to a first exemplary embodiment stores a plurality of measurement values about the moving speed of a touch point in a touch operation and determines the speed of the flick operation based on a part of the stored plurality of pieces of moving speed information. The information processing apparatus according to the first exemplary embodiment stores a plurality of pieces of moving speed information in respective subsections that can be time-divisionally obtained from a sequential movement of a touch point. Further, the information processing apparatus determines a flick speed (i.e., the moving speed of a display image) based on the moving speeds in subsections to be reflected on the speed of the flick operation.

FIG. 1A illustrates an example of a hardware configuration of an information processing apparatus 100 according to the present exemplary embodiment. A central processing unit (CPU) 101, which is configured to perform calculations and logical determinations for various kinds of processing, can control each constituent element connected to a system bus 110. The information processing apparatus 100 includes a plurality of memories. A read-only memory (ROM) 102 is operable as a program memory, which stores programs that cause the CPU 101 to perform controls according to various processing procedures. A random access memory (RAM) 103 is operable as a data memory, which has a work area usable when the CPU 101 executes the above-mentioned programs, a data retreat area usable in error processing, and a loading area usable in loading the above-mentioned control programs. When a program is loadable from an external storage device 109 to the RAM 103, the external storage device 109 can serve as a program memory. A hard disk (HD) 104 is usable to store data and programs relating to the present exemplary embodiment.

The external storage device 109, which is connected to the system bus 110 via an input/output interface 107, is usable as a device comparable to the HD 104. The external storage device 109 can be constituted, for example, by a recording medium and an external storage drive that can realize an access to the recording medium. For example, the recording medium is a flexible disk (FD), a compact disk (CD)-ROM, a digital versatile disk (DVD), a universal serial bus (USB) memory, a magneto-optical (MO) disk, or a flash memory. Further, the external storage device 109 may be a server apparatus connected to a network. Information used in the present exemplary embodiment is stored in the RAM 103, the HD 104, or the external storage device 109. An input interface 105, which is configured to control an input device (e.g., a pointing device), can acquire an input signal to recognize a touch operation if it is input to the information processing apparatus 100, and notifies the system of the recognized touch operation. To control a result of various processing to be output, an output interface 106 can output a control signal to an output unit including a display unit (e.g., a liquid crystal display or a TV monitor). As used herein, the term "unit" generally refers to any combination of software, firmware, hardware, or other component that is used to effectuate a purpose.

A touch panel display 108 includes a touch panel serving as the input unit and a display device serving as the output unit, which are integrated with the information processing apparatus 100. In the present exemplary embodiment, the touch panel display 108 may be an external apparatus connected to the information processing apparatus 100 or independent of the information processing apparatus 100. The touch panel employed in the present exemplary embodiment is a capacitance-type touch panel, which can identify the coordinate position of a touch point of a user finger (i.e., an operation object) on a contact surface of the panel. Further, the touch panel according to the present exemplary embodiment may be configured to be operable in a high-sensitivity mode, in which the sensitivity of a touch sensor is set to be higher so that an approaching finger can be detected as a touch point before the finger contacts the surface of the touch panel display 108. In the high-sensitivity mode, it is feasible to detect positional information, as a touch operation based touch point, in a state where the operation object is approaching the touch panel display 108 immediately after the operation object performs a flick operation. The type of the touch panel is not limited to the capacitance type. For example, any other touch panel that is equipped with an optical sensor or operable based on electromagnetic induction can be employed to detect a user who is approaching to or contacts the operation surface.

FIG. 1B is a block diagram illustrating a functional configuration of the information processing apparatus 100 according to the present exemplary embodiment.

The information processing apparatus 100 according to the present exemplary embodiment includes a detection unit 111, an acquisition unit 112, a first determination unit 114, a second determination unit 115, and an output control unit (display control unit) 116. Each functional unit can be realized when the CPU 101 executes a program loaded from the ROM 102 to the RAM 103 to perform processing according to each flowchart described below. Further, the information processing apparatus 100 according to the present exemplary embodiment includes a storage unit 113, which is a functional unit of the RAM 103. However, the present disclosure can be similarly realized by an information processing apparatus that has a hardware configuration comparable to the above-mentioned functional units. Each element is described in detail below.

The detection unit 111 can detect information about a touch point touched by a user, based on a notification signal received from the input interface 105. In this case, in the present exemplary embodiment, the input interface 105 refers to touch point information detected by the touch panel (i.e., the input unit) at predetermined intervals. The input interface 105 sends a notification signal to the detection unit 111 each time the touch point information is acquired. The touch point information detected by the detection unit 111 includes at least positional information about a series of touch points. In the present exemplary embodiment, the touch point information further includes touch point detection time. Further, if the operation object has been moved away from the touch panel and the touch point is no longer present on the touch panel when the input interface 105 refers to the touch point information, the input interface 105 notifies the detection unit 111 of the release of the operation object. The detection unit 111 manages the detected touch point information. In a case where the touch panel is configured to enable a user to perform a multi-touch operation, the input interface 105 refers to information about a plurality of touch points at predetermined intervals and sends a notification signal to the detection unit 111 each time when information about each touch point is acquired. In this case, the information about the touch points includes ID information to identify each one of the detected touch points. In this case, it is useful to associate the ID information with the detection order of each touch point so that the management of a plurality of touch points becomes easy. The detection unit 111 can detect the latest information about each touch point based on ID information and can identify a movement of the touch point if the touch point having the same ID information is detected at a position different from the previous position.

The acquisition unit 112 refers to the touch point related information detected by the detection unit 111, and stores a series of touch point information and touch point movement information in a plurality of subsections each corresponding to a region intervening between two points included in the series of positional information in the storage unit 113. In response to a release of a touch point, the acquisition unit 112 according to the present exemplary embodiment acquires a plurality of moving speeds by actually measuring a touch point movement in each subsection between two continuous points of the series of touch point positional information (i.e., touch positions) based on the distance between two points and detection time interval information. Further, the acquisition unit 112 stores information indicating the acquired plurality of moving speeds together with the series of positional information detected by the detection unit 111 in the storage unit 113. However, the acquisition unit 112 may be configured to acquire a moving speed of the touch point in a corresponding section, each time when the touch point is detected by the detection unit 111, with reference to a moving distance from the previously detected touch point position and a detection interval.

Further, in the present exemplary embodiment, to reduce the required resources and to acquire only the moving speed information during a flick operation, if the number of touch point related information exceeds a predetermined number, the acquisition unit 112 deletes older touch point related information stored in the storage unit 113. However, the acquisition unit 112 may be configured to store all of the information without adjusting the amount of the information stored in the storage unit 113. Further, as a modified example, it is feasible to delete a plurality of pieces of moving speed information acquired a predetermined time before the acquisition timing of the lastly acquired touch point (or moving speed) information from the storage unit 113.

The first determination unit 114 determines whether to reflect the movement of the touch point on the moving speed in input operation in a plurality of subsections each corresponding to a distance between two points included in a series of touch point positional information. In the present exemplary embodiment, the first determination unit 114 does not reflect a subsection, if the touch point has moved at a moving speed satisfying predetermined conditions, on the moving speed in the input operation. In other words, the first determination unit 114 excludes each moving speed if it satisfies predetermined conditions, from a plurality of pieces of moving speed information stored in the storage unit 113. Then, the first determination unit 114 extracts the remaining (not excluded) moving speed information and reflects each subsection corresponding to a movement at the remaining (not excluded) moving speed on the moving speed in the input operation. In the present exemplary embodiment, in this case, the first determination unit 114 determines each moving speed of the plurality of pieces of moving speed information stored in the storage unit 113, if it satisfies the predetermined conditions, as an exclusion candidate. More specifically, the first determination unit 114 designates the corresponding subsection as a candidate that is not reflected on the moving speed in the input operation. The first determination unit 114 may exclude all of the moving speeds if they are designated as exclusion candidates. Further, it is useful that the first determination unit 114 designates each moving speed, if it satisfies one condition, as an exclusion candidate and then excludes the exclusion candidate, if it satisfies another condition, from the moving speed information usable to determine the moving speed in the input operation. The first determination unit 114 according to the first exemplary embodiment determines each moving speed as an exclusion candidate if it is included in a predetermined speed range. Further, the first determination unit 114 excludes a predetermined number of moving speeds (i.e., a part of the exclusion candidates), selected from faster ones, from the moving speed information usable to determine the moving speed in the input operation. Further, the first determination unit 114 determines not to reflect subsections in which the touch point moves at the excluded moving speed on the moving speed in the input operation. On the other hand, the first determination unit 114 determines to reflect each subsection in which the touch point moves at the remaining (not excluded) moving speed on the moving speed in the input operation.

In the present exemplary embodiment, the acquisition unit 112 can adjust the number of a plurality of pieces of moving speed information stored in the storage unit 113. Accordingly, the first determination unit 114 determines whether the moving speed satisfies a predetermined exclusion condition, as part of processing for determining whether to reflect each subsection corresponding to the stored moving speed on the moving speed in the input operation. However, the processing to be performed by the first determination unit 114 is not limited to the above-mentioned example. For example, in a case where the acquisition unit 112 stores all of moving speed information acquired in a series of operations, the first determination unit 114 may determine whether to satisfy the exclusion condition only for a predetermined number of new information or information acquired in a predetermined time range.

The second determination unit 115 determines a moving speed that represents an input operation based on the moving speed information extracted by the first determination unit 114. In the present exemplary embodiment, the second determination unit 115 determines a mean value of all moving speeds extracted without being excluded as the moving speed representing the input operation. The second determination unit 115 notifies the output control unit 116 of the determined moving speed. The moving speed acquired by the acquisition unit 112 is an actual measurement value. On the other hand, the moving speed determined by the second determination unit 115 corresponds to the speed of an operation performed by a user. In the present exemplary embodiment, it is presumed that a user performs a flick operation. Therefore, in the following description, the moving speed of a flick operation determined by the second determination unit 115 is referred to as "flick speed." In the present exemplary embodiment, the second determination unit 115 receives the moving speed information extracted by the first determination unit 114 and calculates a mean value of moving speeds. However, when the first determination unit 114 determines information to be excluded, it is useful that the second determination unit 115 extracts target information and perform flick speed determination processing.

To feedback the result of an input operation, the output control unit 116 generates a display image to be scrolled at a scroll speed that corresponds to the flick speed determined by the second determination unit 115. Further, the output control unit 116 outputs the generated image to the touch panel display 108 (i.e., the output unit). In this case, the output control unit 116 performs a display control so as to set an initial speed of the scroll to be identical to the flick speed and then gradually reduce the scroll speed until the scroll finally stops. Further, it is useful to disregard a flick-like operation if the motion speed is less than a predetermined speed. In this case, the output control unit 116 does not scroll the displayed image even when the operation object is released from the touch panel.

The information processing apparatus according to the present exemplary embodiment performs processing for each one of a plurality of subsections, each corresponding to the distance between two continuous points included in the series of positional information. Further, the information processing apparatus according to the present exemplary embodiment determines whether to reflect the movement in each subsection on the moving speed in the input operation based on the moving speed information in a plurality of subsections. However, the present disclosure is not limited to the above-mentioned examples. For example, it is useful to determine whether to reflect the movement in each subsection on the moving speed in the input operation based on the moving distance in each subsection corresponding to the line connecting two continuous points. Further, for example, it is useful to define a plurality of equidistance sections and perform the above-mention determination with reference to the moving time that is required when a touch point moves a predetermined distance in each subsection. Further, the above-mentioned two points included in the series of positional information are not limited to two points continuously detected and may be the first and latest touch points in a touch operation.

FIG. 2 is a flowchart illustrating an example of flick operation recognizing processing performed by the information processing apparatus 100 according to the present exemplary embodiment. The information processing apparatus 100 starts the processing of the flowchart illustrated in FIG. 2 in response to a touch notification from the input interface 105 that informs information about a touch point detected on the touch panel. Further, the information processing apparatus 100 starts the processing of the flowchart illustrated in FIG. 2 in response to a release notification from the input interface 105 that informs that the touch point is not present on the touch panel. The input interface 105 refers to the present status at predetermined intervals to generate the touch notification and the release notification.

First, in step S201, the detection unit 111 detects a touch point. The detection unit 111 detects touch point information, if it is notified from the input interface 105, based on the information detected by the touch panel. Further, if a release notification is received from the input interface 105, the detection unit 111 determines that an operation object is moved away from the touch point corresponding to the detection time thereof.

Next, in step S202, the acquisition unit 112 determines whether the latest information detected by the detection unit 111 in step S201 indicates that the touch point has been released. If it is determined that the detected latest information indicates the release of the touch point (YES in step S202), the operation proceeds to step S204. On the other hand, if it is determined that the latest information does not indicate the release of the touch point, more specifically, if it is determined that the touch by the operation object is continuously detected (NO in step S202), the operation proceeds to step S203.

In step S203, because no flick operation is currently performed, the acquisition unit 112 stores the touch point related information detected by the detection unit 111 in the storage unit 113 and terminates the processing of the flowchart illustrated in FIG. 2. In this case, as mentioned above, if the number of acquisitions about the touch point related information exceeds a predetermined number of times, the acquisition unit 112 according to the present exemplary embodiment deletes some older data from a series of touch point related information stored in the storage unit 113. Accordingly, information constantly stored in the storage unit 113 is information acquired in a predetermined number of latest touch point detections, more specifically, touch point information obtained during a predetermined time before the touch point is no longer detected.

Although it is feasible to calculate the moving speed in step S203, the processing function load will increase if moving speed acquiring processing is performed each time the touch point is notified. Therefore, in the present exemplary embodiment, the processing to be performed in step S203 does not include calculating the moving speed. Further, in a case where the information processing apparatus 100 recognizes a touch operation other than the flick operation, it is useful to perform determination processing (for example, for identifying an input of a locus indicating a predetermined gesture operation) as an additional processing to be performed after step S203.

On the other hand, in step S204, the acquisition unit 112 acquires a moving speed of the touch point in each of subsections obtained through the time-division processing, with reference to a series of information stored in the storage unit 113. In the present exemplary embodiment, the acquisition unit 112 acquires the moving speed with reference to the distance between a first coordinate point where the touch point has been first detected and a second coordinate point where the same touch point has been next detected, and a detection time interval. The acquisition unit 112 can acquire the moving speed for each of the touch point detections by successively performing the above-mentioned processing with reference to a series of touch point information that has been time-sequentially stored in the storage unit 113. The acquisition unit 112 causes the storage unit 113 to store the acquired moving speed information.

Next, in step S205, the first determination unit 114 performs processing for determining whether to reflect the movement information in each subsection on the moving speed in the input operation. In the present exemplary embodiment, in step S204, the acquisition unit 112 determines exclusion candidates based on the moving speed information in each subsection stored in the storage unit 113. Then, the acquisition unit 112 excludes some of the moving speeds based on the determined exclusion candidates and extracts the remaining moving speeds. More specifically, the acquisition unit 112 reflects the subsection corresponding to the extracted moving speed on the moving speed in the input operation without reflecting the subsection corresponding to the excluded moving speed on the moving speed in the input operation. The exclusion condition used in the above-mentioned determination is described in detail below. Further, the mean value of moving speeds cannot be obtained when the time intervals of respective touch point detections are not constant. Therefore, it is also useful to calculate a flick speed with reference to a sum value of moving distances corresponding to the moving speeds extracted by the first determination unit 114 and a sum value of actually detected time intervals.

In step S206, the second determination unit 115 calculates a mean value obtained by dividing a sum value of moving speeds extracted by the first determination unit 114 by the number of the extracted moving speeds, and determines the calculated mean value as flick speed. However, the moving speed determination processing to be performed in step S206 is not limited to the mean value of the moving speeds. For example, the second determination unit 115 may determine a flick speed based on the maximum and minimum moving speeds, or the first and last moving speeds, of the extracted moving speed information.

Next, in step S207, the output control unit 116 determines that the input touch operation is the flick operation if the flick speed determined in step S206 is higher than a predetermined reference value. The output control unit 116 performs processing corresponding to the flick operation considering the screen or the touch position. For example, in the present exemplary embodiment, the output control unit 116 generates a display image (i.e., an image that displays a scrolled state) to scroll the screen display according to the flick speed of the flick operation. After the output control unit 116 outputs the generated display image to the touch panel display 108, the information processing apparatus 100 terminates the flick operation recognizing processing of the flowchart illustrated in FIG. 2. The flow of the processing to recognize the flick operation has been described above.

FIG. 3 is a flowchart illustrating an example of the moving speed extraction processing to be performed in step S205. In the present exemplary embodiment, first, the first determination unit 114 performs exclusion candidate determination processing for designating moving speeds included in a predetermined speed range being set as a target to be excluded (hereinafter, referred to as "exclusion range"), as exclusion candidates, from a plurality of pieces of moving speed information acquired by the acquisition unit 112. Then, the first determination unit 114 designates only a predetermined number of higher moving speeds included in the exclusion candidates, as exclusion targets, and excludes the designated moving speeds from the plurality of pieces of moving speed information stored in the storage unit 113, and extracts the remaining speed information. In an example described below, three higher moving speeds included in the exclusion candidates are designated as exclusion targets. Before performing the processing of the flowchart illustrated in FIG. 3, the first determination unit 114 designates three pieces of 0 moving speed information as initial exclusion targets, and stores the designated speed information in the storage unit 113.

First, in step S301, the first determination unit 114 selects leading information included in the plurality of pieces of moving speed information stored in the storage unit 113 as a processing target speed A. In the present exemplary embodiment, moving speed information of each subsection obtained through time-division processing is time-sequentially stored in the storage unit 113. Accordingly, the leading information included in the moving speed information is a moving speed of the oldest movement.

Next, in step S302, the first determination unit 114 determines whether the processing target speed A is included in the exclusion range. The exclusion range in the present exemplary embodiment is a range that designates the speed value that is not positively used in determining the flick speed. More specifically, a range that statistically includes a large speed detected when the operation object is released from the frictional engagement with the touch panel surface is set as the exclusion range. If it is determined that the speed A is included in the exclusion range (YES in step S302), the operation proceeds to step S303. On the other hand, if it is determined that the speed A is not included in the exclusion range (NO in step S302), it is unnecessary to exclude the speed A. Therefore, the operation proceeds to step S310.

In step S303, the first determination unit 114 determines the speed A as an exclusion candidate, which is a moving speed candidate to be excluded from the moving speed information used in the determination of the flick speed.

In subsequent steps S304 to S309, the first determination unit 114 performs processing for comparing the speed A with the speed designated as an exclusion target to exclude a predetermined number of higher speeds included in the moving speed information included in the exclusion range and stored in the storage unit 113. In the present exemplary embodiment, as an example, the first determination unit 114 determines three higher moving speeds included in the exclusion range as exclusion candidates. Through the above-mentioned processing, it is feasible to prevent a calculated flick speed from becoming excessively larger compared to the value intended by a user.

First, in step S304, the first determination unit 114 selects the maximum speed, as a processing target speed B, among the speeds determined as exclusion targets. However, in the initial processing, the speed B selected by the first determination unit 114 is 0 because the designated initial value of the exclusion target is 0.

In step S305, the first determination unit 114 determines whether the speed A is higher than the speed B. If it is determined that the speed A is higher than the speed B (YES in step S305), the operation proceeds to step S308. If it is determined that the speed A is equal to or lower than the speed B (NO in step S305), the operation proceeds to step S306.

In step S306, the first determination unit 114 determines whether the speed A is compared with all of the predetermined number of moving speeds designated as exclusion targets. In the present exemplary embodiment, the predetermined number is 3. Therefore, the first determination unit 114 determines whether the speed A has been compared with all of three exclusion target speeds. If it is determined that the comparison with all exclusion targets has been completed (YES in step S306), the operation proceeds to step S310. If it is determined that the comparison with all exclusion targets is not yet completed (NO in step S306), the operation proceeds to step S307.

In step S307, the first determination unit 114 selects the next highest exclusion target speed included in the moving speeds designated as exclusion targets, as the speed B, and the operation returns to step S305.

On the other hand, in step S308, the first determination unit 114 designates the moving speed selected as the speed A, as an exclusion target, and stores the designated information in the storage unit 113. In the present exemplary embodiment, the first determination unit 114 excludes three higher moving speeds included in the range determined in step S302 from the plurality of pieces of moving speed information stored in the storage unit 113. Accordingly, when the speed A is higher than the speed B designated as an exclusion target, there is a higher possibility that the speed A is one of the three higher moving speeds. Therefore, the first determination unit 114 designates the speed A as an exclusion target.

In step S309, the first determination unit 114 excludes the minimum speed information from the moving speeds designated as exclusion targets and sorts the exclusion target speeds according to speed. At the time when the speed A is added as the exclusion target in step S308, the first determination unit 114 determines that the minimum moving speed designated as an exclusion target is not any one of the three higher moving speeds. Accordingly, the first determination unit 114 excludes the minimum moving speed from the exclusion targets. The storage unit 113 stores three moving speed values presently designated as exclusion targets while sorting them according to size.

Next, in step S310, the first determination unit 114 determines whether processing of all stored moving speed information including the last information has been completed. If it is determined that the processing of the last information has been completed (YES in step S310), the operation proceeds to step S312. If it is determined that the last information is not yet processed (NO in step S310), the operation proceeds to step S311.

In step S311, the first determination unit 114 selects the next stored moving speed, as the speed A, from the plurality of pieces of moving speed information stored in the storage unit 113. Then, the operation returns to step S302.

In step S312, the first determination unit 114 determines to reflect the movement in a subsection corresponding to the moving speed designated as an exclusion target on the moving speed in the input operation. On the other hand, the first determination unit 114 determines to reflect the movement in a subsection corresponding to the moving speed not designated as an exclusion target on the moving speed in the input operation.

In step S313, the first determination unit 114 extracts all speed information that is not yet designated as exclusion targets from the plurality of pieces of moving speed information stored in the storage unit 113. Then, the operation returns to the processing of the flowchart illustrated in FIG. 2. The exclusion target moving speed information stored in the storage unit 113 is initialized to the value "0" at arbitrary timing after the flick speed is determined, for example, when a detection of a newly touch point is notified or when a display control based on a flick operation is completed.

The first determination unit 114 performs the moving speed extraction processing in step S205, as described above, in the present exemplary embodiment. The above-mentioned moving speed extraction processing includes the processing for designating moving speeds included in a predetermined range as exclusion candidates (see step S302) and the processing for excluding a predetermined number of higher moving speeds (see steps S304 to S309). However, it is also useful that the moving speed extraction processing includes only one of the above-mentioned two types of processing. Further, as described in the present exemplary embodiment, it is useful to employ both the processing for designating moving speeds included in a predetermined range as exclusion targets (step S302) and the processing for excluding a predetermined number of moving speeds (according to a notified order or randomly). As described above, the information processing apparatus performs adjustment processing to extract a sufficient number of moving speeds to determine a flick speed by excluding a predetermined number of moving speeds included in a predetermined range. Further, the information processing apparatus sets an initial value of the exclusion target speed to 0. Therefore, in a case where the number of moving speeds included in an exclusion range does not reach a predetermined number, a predetermined number of moving speeds designated as exclusion targets include 0. Accordingly, the information processing apparatus does not exclude a higher moving speed if it is not included in the exclusion range.

As described above, the information processing apparatus according to the present exemplary embodiment excludes a higher moving speed, which has been detected at the moment when an operation object is released from a frictional engagement with a touch panel, from a plurality of moving speeds acquired at predetermined time intervals. Then, the information processing apparatus determines a flick speed based on the remaining moving speed information. Therefore, even if a user moves the operation object away from the touch panel at a speed higher than the intended speed at the moment when the operation object is released from the frictional engagement with the touch panel, it is feasible to adjust the flick speed to be a value comparable to the moving speed of the operation object intended by the user. Accordingly, the information processing apparatus according to the present exemplary embodiment can prevent an image displayed on a display screen from being scrolled at a high speed that greatly exceeds the moving speed of the operation object intended by the user. Thus, the information processing apparatus according to the present exemplary embodiment can realize a flick operation that does not make a user feel any discomfort.

<First Operational Example>

As a first operational example, a user can operate the information processing apparatus 100 according to the first exemplary embodiment in the following manner.

FIGS. 4A, 4B, and 4C illustrate a series of touch points detected when a flick operation is performed. FIGS. 4A and 4B illustrate an example movement of a touch point in the flick operation performed by a user with a finger 410 (i.e., the operation object), in which a locus is constituted by a plurality of coordinate points each representing the movement of the touch point. FIG. 4B is an enlarged view of FIG. 4A. A coordinate system employed to express the touch point has the origin on the upper left corner of an input area 400, in which an x-coordinate value represents the touch position of the finger 410 in the horizontal direction and a y-coordinate value represents the touch position of the finger 410 in the vertical direction. The unit "dot" representing the screen resolution of the touch panel display 108 is used in the employed coordinate system. FIG. 4C is a table indicating information about a predetermined number of touch points stored in step S203, including x-coordinate value representing each touch point, moving distance between neighboring touch points, moving time required in movement between neighboring touch points, moving speed in a subsection between neighboring touch points, and determination whether to exclude the moving speed. FIG. 4C does not include y-coordinate information because the relationship between the moving distance, the moving time, and moving speed is similar to that of the x-coordinate information.

In the first operational example, it is presumed that a user performs a flick operation by intuitively flicking the finger 410 on the screen so that the speed of approximately 800 dot/s can be recognized. However, it is unnecessary for the user to be aware of an actual operational speed value. According to the example illustrated in FIG. 4C, higher moving speeds are detected in a transition from the touch point 404 to the touch point 405 (i.e., 2200 dot/s) as well as in a transition from the touch point 406 to the touch point 407 (i.e., 1600 dot/s). For example, according to a conventional technique, the moving speed detected immediately before the user releasing the touch point is recognized as the flick speed. In this case, the detected flick speed 1600 dot/s may be greatly higher than the actual flick speed. Thus, the flick speed is erroneously recognized.

Hereinbelow, predetermined parameters to be set in the first operational example are described in detail below. In the first operational example, it is presumed that touch point detection information is notified from the input interface 105 at intervals of 20 ms. The acquisition unit 112 stores six pieces of touch point information notified during six consecutive detections to acquire five moving speeds (each representing moving distance/20 ms). In general, the time required for a single flick operation is 20 [ms]×6 [times]=120 [ms]. This is the reason why the above-mentioned values are selected. Further, the first determination unit 114 designates three higher moving speeds that are included in an exclusion range from 800 dot/s to 2,500 dot/s as exclusion targets. At the processing start timing, three moving speeds having initial values [0 dot/s, 0 dot/s, and 0 dot/s] are set as exclusion targets and stored in the storage unit 113. Further, the information processing apparatus 100 according to the first operational example recognizes that a flick operation has been performed when the flick speed output from the second determination unit 115 is higher than a threshold value 200 dot/s. The information processing apparatus 100 scrolls an image displayed on a display screen according to the flick speed. If the flick speed is equal to or less than the threshold value, it can be regarded that a user has moved the finger 410 away from the touch panel without intentionally performing a flick operation. More specifically, the touch operation has been released in this case.

First, the information processing apparatus 100 starts the flick operation recognizing processing (according to the flowchart illustrated in FIG. 2) in response to information about the touch point 401 notified from the input interface 105 when the user touches the touch panel with the finger 410. In step S201, the detection unit 111 detects the touch point 401. The detection unit 111 performs the touch point detection processing in step S201 in response to each touch point information notified every 20 ms. In step S202, the acquisition unit 112 determines that the touch point is not yet released because the touch point 401 has been detected in step S201. Thus, the operation proceeds to step S203. In this case, the number of pieces of moving speed information stored in the storage unit 113 is equal to the initial value "0." In step S203, the detected touch point related information is stored in the storage unit 113. The stored information includes coordinate information indicating the position of the touch point 401 (e.g., x coordinate=400, y coordinate=300, and touch point detection time). In the present exemplary embodiment, the touch point 401 is initially detected by the user after the touch operation is started. Therefore, the acquisition unit 112 stores the acquired information about the touch point 401 in the first storage area of the storage unit 113. Then, the information processing apparatus 100 terminates the flick operation recognizing processing.

The information processing apparatus 100 repeats the above-mentioned processing in steps S201 to S203 until the number of pieces of touch point information stored in the storage unit 113 reaches the predetermined number (=6) and stores a series of touch point positional information in the storage unit 113 according to detection time. In the first operational example, the information processing apparatus 100 repeats the above-mentioned processing until information about the touch point 406 is stored in the storage unit 113, although redundant description thereof will be avoided.

Next, the information processing apparatus 100 starts the processing of the flowchart illustrated in FIG. 2 in response to information about the touch point 407 notified from the input interface 105. In step S203, the acquisition unit 112 deletes the oldest information (i.e., the information about the touch point 401) because the number of pieces of touch point information stored in the storage unit 113 is already 6 when the information about the touch point 407 is stored in the storage unit 113. In this case, in the present exemplary embodiment, the information processing apparatus 100 stores the touch point information in corresponding storage areas while sorting the information according to detection time. As described above, the information about the touch points 402 to 407 is stored in the storage unit 113. If new information is notified at a position different from the touch point 407 when the user continuously performs the touch operation, the information processing apparatus 100 repeats similar processing. As described above, the information processing apparatus 100 according to the present exemplary embodiment can control the amount of storage area to be used by performing old information deletion processing when the number of the acquired touch point information exceeds a predetermined number.

According to the example illustrated in FIG. 4B, the user moves the finger 410 away from the touch panel immediately after the notification of the information about the touch point 407. Therefore, at the time when 20 ms has elapsed since the notification of the information about the touch point 407, touch point release information is notified from the input interface 105. The information processing apparatus 100 starts the processing of the flowchart illustrated in FIG. 2. More specifically, the detection unit 111 determines that the touch point has been released (YES in step S202). The operation proceeds to step S204. In step S204, the acquisition unit 112 acquires a moving speed in each subsection between continuously detected touch points, based on a series of information stored in the storage unit 113. More specifically, the acquisition unit 112 obtains a moving distance with reference to coordinate information of the touch point 402 stored in the first storage area and coordinate information of the touch point 403 stored in the second storage area. The obtained moving distance is equal to 15 dots, as illustrated in FIG. 4C. The acquisition unit 112 can obtain a moving speed value by dividing the obtained moving distance by the touch point movement time (more specifically, touch point notification interval (=20 ms) according to the following moving speed calculation formula. Moving distance [dot]×1000÷Moving time [ms]=Moving speed [dot/s]

The formula includes multiplication using a numerical value 1000 for conversion from millisecond to second. The conversion from millisecond to second is effective to increase the calculation speed because the calculation accuracy can be substantially maintained even when decimal fractions are truncated. Through the above-mentioned calculation processing, the acquisition unit 112 acquires a numerical value 750 dot/s that indicates a moving speed in a subsection between the touch point 402 and the touch point 403. Similarly, the acquisition unit 112 acquires a numerical value 850 dot/s that indicates a moving speed in a subsection between the touch point 403 and the touch point 404. Further, the acquisition unit 112 acquires a numerical value 2200 dot/s that indicates a moving speed in a subsection between the touch point 404 and the touch point 405. The table illustrated in FIG. 4C includes five moving speed values acquired in respective subsections provided between the touch point 402 to the touch point 407. If the acquisition unit 112 completes the above-mentioned processing for acquiring the moving speed in each subsection between continuously detected touch points, for all of the touch point information stored in the storage unit 113, the operation proceeds to step S301 (i.e., the internal processing of step S205).

In step S301, the first determination unit 114 selects, as the processing target speed A, the leading information (i.e., the moving speed in the subsection between the touch point 402 and the touch point 403 in the first operational example=750 dot/s) included in five moving speed values stored in the storage unit 113. Next, in step S302, the first determination unit 114 determines whether the selected processing target speed A (=750 dot/s) is included in the exclusion range from 800 dot/s to 2,500 dot/s. As the processing target speed A (=750 dot/s) is not included in the exclusion range, it is unnecessary to exclude the target speed A. Accordingly, the operation proceeds to step S310, in which it is determined that the last moving speed stored in the storage unit 113 is not yet processed. Thus, the operation proceeds to step S311. In step S311, the first determination unit 114 selects the next stored moving speed (i.e., the moving speed in the subsection between the touch point 403 and the touch point 404 in the first operational example=850 dot/s), as the processing target speed A. Then, the first determination unit 114 repeats the processing of steps S302 to S310 on the newly selected target speed A.

As the moving speed 850 dot/s is included in the exclusion range, the determination result in step S302 becomes YES. In other words, the first determination unit 114 determines the newly selected target speed A as an exclusion candidate. Then, the operation proceeds to step S304. In step S304, the first determination unit 114 selects the maximum speed, as the processing target speed B, among three speeds designated as exclusion targets. At this moment, the initial value of the exclusion target is "0" dot/s. Therefore, the target speed to be processing initially is 0 dot/s. Therefore, the first determination unit 114 determines that the speed A (i.e., the moving speed 850 dot/s) is higher than the speed B (i.e., 0 dot/s) (YES in step S305). In step S308, the first determination unit 114 designates the speed A (i.e., the moving speed 850 dot/s) as an exclusion target. The table illustrated in FIG. 4C includes a mark "○" indicating that the corresponding moving speed is an exclusion target. In step S309, the first determination unit 114 excludes the minimum speed (i.e., 0 dot/s) from the exclusion target speeds stored in the storage unit 113 and sorts the information about three speeds designated as exclusion targets according to the speed. Therefore, the exclusion target speed information is stored in the storage unit 113 in order of [850 dot/s, 0 dot/s, and 0 dot/s]. Then, it is determined that the last moving speed information is not yet processed (NO in step S310), the first determination unit 114 selects the next stored moving speed information (i.e., the moving speed in the subsection between the touch point 404 and the touch point 405=2200 dot/s) as the processing target speed A. Subsequently, the first determination unit 114 repeats the above-mentioned processing until the processing for the last moving speed information (i.e., the moving speed in a subsection between the touch point 406 and the touch point 407 in the first operational example=1600 dot/s) stored in the storage unit 113 terminates.

As illustrated in FIG. 4C, any one of unprocessed information (i.e., 2200 dot/s, 800 dot/s, and 1600 dot/s) of five moving speeds stored in the storage unit 113 is included in the exclusion range. Therefore, the exclusion target speed information finally stored in the storage unit 113 is [2200 dot/s, 1600 dot/s, and 850 dot/s].

If it is determined that the processing for the five moving speeds stored in the storage unit 113 is entirely completed (YES in step S310), then in step S313, the first determination unit 114 extracts speed information that is not yet designated as an exclusion target from the plurality of pieces of moving speed information stored in the storage unit 113. In the first operational example, the first determination unit 114 extracts 750 dot/s (i.e., the moving speed in the subsection between the touch point 402 and the touch point 403) and 800 dot/s (i.e., the moving speed in a subsection between the touch point 405 and the touch point 406). Then, the operation returns to the main processing of the flowchart illustrated in FIG. 2.

In step S206, the second determination unit 115 determines the flick speed by calculating a mean value of the two moving speeds extracted by the first determination unit 114. More specifically, the second determination unit 115 obtains a sum of the extracted moving speed values (i.e., 750 [dot/s]+800 [dot/s]=1550 [dot/s]) and divides the obtained sum by the number of extracted information (=2). Thus, the second determination unit 115 determines a mean value 775 dot/s obtained in this manner as the flick speed.

In step S207, the output control unit 116 determines that the input touch operation is the flick operation because the determined flick speed 775 dot/s is higher than a threshold value 200 dot/s (i.e., a reference value to be used to determine whether the flick operation has been performed). Accordingly, the output control unit 116 generates a display image to be scrolled at a speed corresponding to the flick speed 775 dot/s and outputs the generated image to the touch panel display 108. Then, the information processing apparatus 100 terminates the processing of the flowchart illustrated in FIG. 2.

Through the above-mentioned sequential processing, in the first operational example, it is feasible to obtain the flick speed 775 dot/s that is close to the speed of a flick operation actually performed by a user (i.e., approximately 800 dot/s.

As described above, the information processing apparatus according to the present exemplary embodiment stores a plurality of pieces of touch point moving speed information acquired at predetermined time intervals and determines a flick speed, when the touch point is released, based on a limited number of speed information, which does not include a part of the plurality of pieces of stored information excluded with reference to predetermined conditions. Further, the predetermined exclusion condition employed in the first exemplary embodiment is "excluding a predetermined number of higher moving speeds that are included in a predetermined range." Therefore, it is feasible to exclude a higher moving speed that is detectable when a user moves an operation object away from the touch panel or randomly occurs when the operation object is moving. Thus, the information processing apparatus according to the present exemplary embodiment can determine an appropriate flick speed based on speed information acquired when a user is intentionally moving a finger, even when an operation object is influenced by the frictional engagement with the touch panel and the operation object moves at a speed higher than the expected speed immediately before the operation object is moved away from the touch panel. Accordingly, the information processing apparatus according to the present exemplary embodiment can improve user operability in a flick operation.

Further, if the flick operation is performed with a force that exceeds the frictional resistance of the touch panel (more specifically at a higher speed), the operation object is substantially released from the frictional engagement. Therefore, in this case, it is unnecessary to perform moving speed exclusion processing. Accordingly, the information processing apparatus according to the present exemplary embodiment provides an upper limit to be applied to the exclusion range. In other words, the information processing apparatus according to the present exemplary embodiment can determine an appropriate flick speed without excluding any moving speed when the flick operation is performed at a higher speed.

As an example operation, the information processing apparatus according to the present exemplary embodiment scrolls a display image in response to a flick operation. Similarly, the information processing apparatus according to the present exemplary embodiment can cause a touched object (e.g., an image or an icon) to move on a display screen in response to a flick operation.

The information processing apparatus according to the present exemplary embodiment acquires an x-coordinate component and a y-coordinate component of the moving speed so that the moving speed can be expressed as a vector. It is useful to increase the processing speed because square and root calculations can be avoided. However, acquiring both the x-coordinate and y-coordinate components is not always necessary. It is useful to acquire the moving speed of a touch point in an actually advancing direction. Similarly, it is unnecessary to determine x-coordinate and y-coordinate components of a flick speed separately. Further, in the present exemplary embodiment, coordinate information is notified at the intervals of 20 ms. However, thinning out some of the acquired coordinate information may be useful if the notification of coordinate information is performed at shorter intervals.

In the first exemplary embodiment, it is useful to change the number of speed information to be designated as exclusion targets according to the number of pieces of acquired touch point information or moving speed information. In such a modified example, it is feasible to determine an appropriate flick speed even when the amount of information acquirable from information notified at predetermined time intervals is limited, for example, when the input time of a flick operation performed by a user is short.

FIG. 1C is a block diagram illustrating another example of the functional configuration of the information processing apparatus 100. The configuration illustrated in FIG. 1C is different from the configuration illustrated in FIG. 1B in that a measuring unit 117 and a changing unit 118 are additionally provided. The measuring unit 117 is constituted by the CPU 101, the ROM 102, and the RAM 103 as a unit configured to measure the number of moving speed information stored in the storage unit 113. The changing unit 118 is constituted by the CPU 101, the ROM 102, and the RAM 103 as a unit configured to change the number of moving speeds to be set as exclusion targets by the first determination unit 114 according to the number of moving speed values measured by the measuring unit 117. In the present exemplary embodiment, as an example, an initial value set for the number of exclusion speeds is 3. Processing for changing the number of exclusion speeds is described in detail below. However, it is useful that the changing unit 118 determines the number of moving speeds to be initially designated as exclusion targets without setting the initial value for the number of exclusion speeds.

FIG. 5A is a flowchart illustrating another example of the flick operation recognizing processing performed by the information processing apparatus 100. Each processing step, if the content thereof is similar to that illustrated in FIG. 2, is denoted by the same reference numeral used in FIG. 2 and redundant description thereof will be avoided. Processing step, which is different from that illustrated in FIG. 2, is described in detail below. In step S501, the measuring unit 117 measures the number of pieces of moving speed information included in the information stored in the storage unit 113. In step S502, the changing unit 118 changes the number of moving speeds to be designated as exclusion targets according to the number of acquisitions about the moving speed measured in step S501. In the processing of the flowchart illustrated in FIG. 3 to be performed as internal processing of step S205, an initial value is set to designate the changed number of moving speeds as exclusion targets.

FIG. 5B is an example of a table that associates the number of pieces of moving speed information acquired from touch point information acquired by the acquisition unit 112 during a sequential operation, which has been measured by the measuring unit 117, with the number of moving speeds designated as exclusion targets according to the number of the acquired moving speed information. In the present exemplary embodiment, if the number of acquisitions about touch point information is equal to or greater than 7, the information processing apparatus stores six pieces of latest information. Therefore, the upper limit for the number of moving speed information is equal to 5. In this case, three moving speeds (i.e., initial values) are designated as exclusion targets. In a case where the number of stored moving speed information is 4, the number of moving speeds to be designated as exclusion targets is changed to 2. More specifically, the number of exclusion targets is set so as to secure at least two moving speeds to be extracted to determine a flick speed. Extracting at least two moving speeds enables the second determination unit 115 to perform mean value acquisition processing. Accordingly, when the number of pieces of stored moving speed information is 3, the number of moving speeds to be designated as exclusion targets is changed to 1. If the number of pieces of stored moving speed information is 2, the number of moving speeds to be designated as exclusion targets is changed to 0. Further, if the number of pieces of stored moving speed information is 1, the number of moving speeds to be designated as exclusion targets is set to 0. In this case, the second determination unit 115 determines that the stored moving speed (i.e., only one moving speed) as flick speed.

<Second Operational Example>

As a second operational example, a user can operate the information processing apparatus 100 in the following manner. FIGS. 6A, 6B, and 6C illustrate an example of a plurality of touch points that cooperatively constitute a flick operation. The example illustrated in FIGS. 6A to 6C is different from the example illustrated in FIGS. 4A to 4C in that the total number of touch points notified during a flick operation is five. Predetermined parameters being set in the second operational example are similar to those described in the first operational example. Further, even in the second operational example, it is presumed that a user performs a flick operation so as so scroll a display image at the speed of approximately 800 dot/s. In this case, as illustrated in FIG. 6C, higher speeds, such as the moving speed 2200 dot/s and the moving speed 1600 dot/s, are detected due to the influence of the frictional engagement between the user finger 410 and the touch panel.

The input interface 105 notifies information about touch points 601 to 605. In the flowchart illustrated in FIG. 5A, processing to be performed in steps S201 to S203 is similar to the processing described in the first operational example. Therefore, redundant description thereof will be avoided. However, in the second operational example, the touch point is released after it is consecutively notified five times. Therefore, a series of touch point information obtained through five consecutive detections is stored in the storage unit 113.

If release information is notified from the input interface 105 after 20 ms has elapsed since the detection timing of the touch point 605, the information processing apparatus 100 starts the processing of the flowchart illustrated in FIG. 5A. Processing to be performed in steps S201 to S204 is similar to the processing described in the first operational example. In the second operational example, the information processing apparatus 100 acquires moving speed information based on five pieces of touch point information stored in step S203. In step S501, the measuring unit 117 measures the number of pieces of moving speed information stored in the storage unit 113 and notifies the changing unit 118 of a measurement result "4." In step S502, the changing unit 118 changes the number of moving speeds to be designated as exclusion targets to 2 based on the number of pieces of moving speed information notified from the measuring unit 117 and the table illustrated in FIG. 5B. Processing to be performed in step S205 and subsequent steps is similar to the processing described in the first operational example. However, when the predetermined number is changed to 2, two moving speeds [0 dot/s and 0 dot/s] of the exclusion targets are designated as initial values. Two moving speeds [2200 dot/s and 1600 dot/s] are finally designated as exclusion targets. Accordingly, the flick speed finally output by the second determination unit 115 in step S206 is 825 dot/s (i.e., a mean value of 850 dot/s and 800 dot/s), which is close to the speed intended by the user (i.e., approximately 800 dot/s).

As described above, even when a user performs an input operation for a short period of time and the number of acquisitions about the moving speed is small, it is feasible to determine an appropriate flick speed by changing the predetermined number of exclusion speeds.

In the first exemplary embodiment, to prevent the flick speed from becoming excessively high, the exclusion range is set to a speed range greater than the speed of a general flick operation. However, as another exclusion condition, it is useful to exclude a slow speed if the magnitude thereof is less than a predetermined threshold value in acquiring from the flick speed. According to the above-mentioned modified example, it is feasible to prevent the flick speed from becoming lower than the value intended by a user because a slow moving speed of an operation object, which is detectable immediately after a user starts an input operation, is not used in the determination of the flick speed.

FIG. 7 is a flowchart illustrating another example of the flick operation recognizing processing performed by the information processing apparatus 100, in which another exclusion condition is added. Each processing step, if the content thereof is similar to that illustrated in FIG. 2, is denoted by the same reference numeral used in FIG. 2 and redundant description thereof will be avoided. Processing step, which is different from that illustrated in FIG. 2, is described in detail below. In step S701, the information processing apparatus 100 performs secondary section determination processing. More specifically, the first determination unit 114 extracts moving speeds, which do not include any moving speed that satisfies a secondary exclusion condition, from the moving speeds extracted in step S205. In other words, the first determination unit 114 does not reflect any movement in a subsection corresponding to a moving speed that satisfies the secondary exclusion condition on the moving speed in the input operation. On the other hand, the first determination unit 114 reflects the movement in a subsection corresponding to the extracted moving speed on the moving speed in the input operation. The secondary exclusion condition employed in the above-mentioned modified example is excluding any moving speed that is lower than the threshold value and extracting the remaining moving speed information. Even in a case where the moving speed that is slower than the threshold value is excluded, a predetermined number of lower speeds are excluded from a plurality of moving speeds extracted in step S205. Thus, it is feasible to secure the amount of information to be used in flick speed acquiring processing performed by the second determination unit 115. Detailed processing includes comparing moving speeds selected as processing targets with the speed already designated as an exclusion target, similar to the processing for excluding higher moving speed information. The processing further includes designating moving speeds that are determined as being lower than the speed designated as an exclusion target, as exclusion targets, and updating the exclusion target speeds.

<Third Operational Example>

As a third operational example, a user can operate the information processing apparatus 100 in the following manner. FIGS. 8A, 8B, and 8C illustrate an example of a plurality of touch points that cooperatively constitute a flick operation. The example illustrated in FIGS. 8A, 8B, and 8C is different from the example illustrated in FIGS. 6A, 6B, and 6C in that the total number of touch points notified during a flick operation is six. The moving speed acquired at the time when 20 ms has elapsed after starting the flick operation, is a comparatively slow moving speed (i.e., 250 dot/s). Further, even in the third operational example, it is presumed that a user performs a flick operation so as to scroll a display image at the low speed of approximately 800 dot/s. In this case, as illustrated in FIG. 8C, higher speeds, such as the moving speed 2200 dot/s and the moving speed 1600 dot/s, are detected due to the influence of the frictional engagement between a user finger 810 and the touch panel.

FIG. 8C is a table indicating information about respective touch points, including x-coordinate value representing each touch point illustrated in FIG. 8B, moving distance between neighboring touch points, moving time required in movement between neighboring touch points, moving speed in a subsection between neighboring touch points, and determination whether to exclude the moving speed.

Hereinbelow, predetermined parameters to be set in the third operational example are described in detail below. In the third operational example, it is presumed that touch point detection information is notified from the input interface 105 at intervals of 20 ms. The acquisition unit 112 stores six pieces of touch point information notified during six consecutive detections to acquire five moving speeds (each representing moving distance/20 ms). In general, the time required for a single flick operation is 20 [ms]×6 [times]=120 [ms]. This is the reason why the above-mentioned values are selected. Further, the first determination unit 114 designates two higher moving speeds that are included in the exclusion range 800 dot/s to 2500 dot/s and a single moving speed that is lower than the threshold value 300 dot/s as exclusion targets.

Accordingly, the moving speeds to be excluded are 250 dot/s (i.e., the moving speed in a subsection between a touch point 801 and a touch point 802), 2200 dot/s (i.e., the moving speed in a subsection between a touch point 803 and a touch point 804), and 1600 dot/s (i.e., the moving speed in a subsection between a touch point 805 and a touch point 806). As a result, the second determination unit 115 determines a mean value of the extracted moving speeds (=825 dot/s) as flick speed.

As described above, even when the flick speed is acquired by adding additional exclusion condition to exclude any speed that is lower than a predetermined threshold value, it is feasible to obtain an appropriate flick speed (i.e., 825 dot/s) that is close to the speed actually intended by the user (i.e., approximately 800 dot/s). According to the above-mentioned example, it is feasible to prevent the flick speed from becoming lower than the value intended by the user because a slow moving speed of an operation object, which is detectable immediately after the user starts an input operation, is not used in the determination of the flick speed.

Even in a case where the slower moving speed is excluded, it is useful to change the number of exclusion target speed information according to the number of pieces of acquired touch point (or moving speed) information. In this case, the number of exclusion targets can be set so as to enable the first determination unit 114 to refer to at least two pieces of information. The second determination unit 115 can secure the amount of information to be used in the determination of the flick speed. Thus, it is feasible to determine an appropriate flick speed.

A method according to a second exemplary embodiment includes comparing a moving speed with an immediately preceding moving speed included in a plurality of moving speeds that have been time-divisionally acquired, designating a moving speed whose increment amount is greater than a threshold value as an exclusion candidate, and excluding all of the exclusion candidates, as described in detail below.

The information processing apparatus 100 according to the second exemplary embodiment has a hardware configuration and a functional configuration that are similar to those described in the first exemplary embodiment with reference to FIGS. 1A and 1B, and therefore redundant description thereof will be avoided. In the second exemplary embodiment, the information processing apparatus 100 performs user flick operation recognizing processing according to the flowchart illustrated in FIG. 2.

FIG. 9A is a flowchart illustrating an example of the moving speed extraction processing to be performed in step S205 according to the second exemplary embodiment.

First, in step S901, the first determination unit 114 sets a variable "i" to 1.

Next, in step S902, the first determination unit 114 determines whether a value obtainable by subtracting a moving speed value stored in the (i−1)th storage area of the storage unit 113 from a moving speed value stored in the i-th storage area is greater than a predetermined threshold value A. The threshold value A is usable to discriminate a moving speed of an operation object in a state where a user intentionally touches the touch panel from a large speed that is detectable when the operation object is released from the frictional engagement with the touch panel. More specifically, in the present exemplary embodiment, moving speeds are continuously acquired at predetermined time intervals and, if an increment amount relative to the immediately preceding moving speed exceeds the threshold value A, the first determination unit 114 determines that the operation object is released from the frictional engagement with the touch panel. If it is determined that the value obtainable by subtracting the (i−1)th speed from the i-th speed is greater than the threshold value A (YES in step S902), the operation proceeds to step S903. If it is determined that the value obtainable by subtracting the (i−1)th speed from the i-th speed is equal to or smaller than the threshold value A (NO in step S902), the operation proceeds to step S904. However, the (i−1)th moving speed is not present in initial loop processing. Therefore, the determination result in step S902 is NO. The operation proceeds to step S904.

In step S903, the first determination unit 114 determines the i-th moving speed information as an exclusion candidate.

In step S904, the first determination unit 114 determines whether the plurality of pieces of moving speed information stored in the storage unit 113 has been entirely processed. If it is determined that the processing has been entirely completed for all of the speed information (YES in step S904), the operation proceeds to step S906. If it is determined the processing is not yet completed for all of the speed information (NO in step S904), the operation proceeds to step S905.

In step S905, the first determination unit 114 increments the variable "i" to "i+1" and repeats the above-mentioned processing in step S902.

In step S906, the first determination unit 114 determines to reflect the movement in the subsection corresponding to the moving speed designated as an exclusion candidate on the moving speed in the input operation. On the other hand, the first determination unit 114 determines to reflect the movement in the subsection corresponding to the moving speed not designated as an exclusion candidate on the moving speed in the input operation.

In step S907, the first determination unit 114 excludes all of the exclusion candidates from the plurality of pieces of moving speed information stored in the storage unit 113 and extracts the remaining moving speed information. Then, the operation returns to the processing of the flowchart illustrated in FIG. 2.

A table 1000 illustrated in FIG. 10A indicates information about respective touch points that have been detected when a flick operation has been performed as illustrated in FIGS. 4A, 4B, and 4C according to the second exemplary embodiment. The table 1000 includes x-coordinate value representing each touch point, moving distance between neighboring touch points, moving time required in movement between neighboring touch points, moving speed in a subsection between neighboring touch points, increment amount relative to immediately preceding moving speed, and determination whether to exclude the moving speed. In this example, the threshold value A is 500 dot/s.

In the present exemplary embodiment, the first determination unit 114 excludes moving speed information from information to be used in the determination of the flick speed if the difference between the moving speed and the immediately preceding moving speed is greater than 500 dot/s. Accordingly, as illustrated in the table 1000, moving speed 2200 dot/s (i.e., the moving speed in the subsection between the touch point 404 and the touch point 405) and moving speed 1600 dot/s (i.e., the moving speed in the subsection between the touch point 406 and the touch point 407) are excluded and the remaining information is extracted. As a result, the second determination unit 115 determines a mean value of the extracted moving speeds (=800 dot/s) as flick speed.

As described above, moving speeds are continuously acquired at predetermined time intervals. Even when a moving speed is excluded because an increment amount relative to an immediately preceding moving speed exceeds a predetermined threshold value, it is feasible to obtain an appropriate flick speed that is close to the speed intended by the user (i.e., approximately 800 dot/s). In such a case, it is feasible to simplify processing steps compared to the processing steps of the flowchart illustrated in FIG. 3.

In the present exemplary embodiment, all moving speeds that satisfy only one exclusion condition are designated as exclusion candidates and excluded from processing targets of the second determination unit 115. However, the present exemplary embodiment is not limited to the above-mentioned example. In the second exemplary embodiment, it is useful to add another exclusion condition to exclude any exclusion candidate speed that is lower than a threshold value from the processing targets of the second determination unit 115 and obtain a flick speed based on the remaining speeds. With this processing, it is feasible to prevent the flick speed from becoming lower than the value intended by a user because a slow moving speed of an operation object, which is detectable immediately after the user starts an input operation, is not used in the determination of the flick speed. Further, similar to the first exemplary embodiment, it is useful to change the number of pieces of exclusion target speed information according to the number of pieces of acquired touch point (or moving speed) information. In this case, the number of pieces of exclusion targets can be set so as to enable the first determination unit 114 to refer to at least two pieces of information. The second determination unit 115 can secure the amount of information to be used in the determination of the flick speed. Thus, it is feasible to determine an appropriate flick speed.

In a third exemplary embodiment, a moving speed is designated as an exclusion candidate if the moving speed is higher than a mean value of a plurality of moving speeds included in the plurality of pieces of moving speed information stored in the storage unit 113 and a difference thereof is greater than a predetermined threshold value. Further, all of the exclusion candidates are excluded, as described below.

The information processing apparatus 100 according to the third exemplary embodiment has a hardware configuration and a functional configuration that are similar to those described in the first exemplary embodiment with reference to FIGS. 1A and 1C, and therefore redundant description thereof will be avoided. In the third exemplary embodiment, the information processing apparatus 100 performs user flick operation recognizing processing according to the flowchart illustrated in FIG. 2.

Figure 9B:
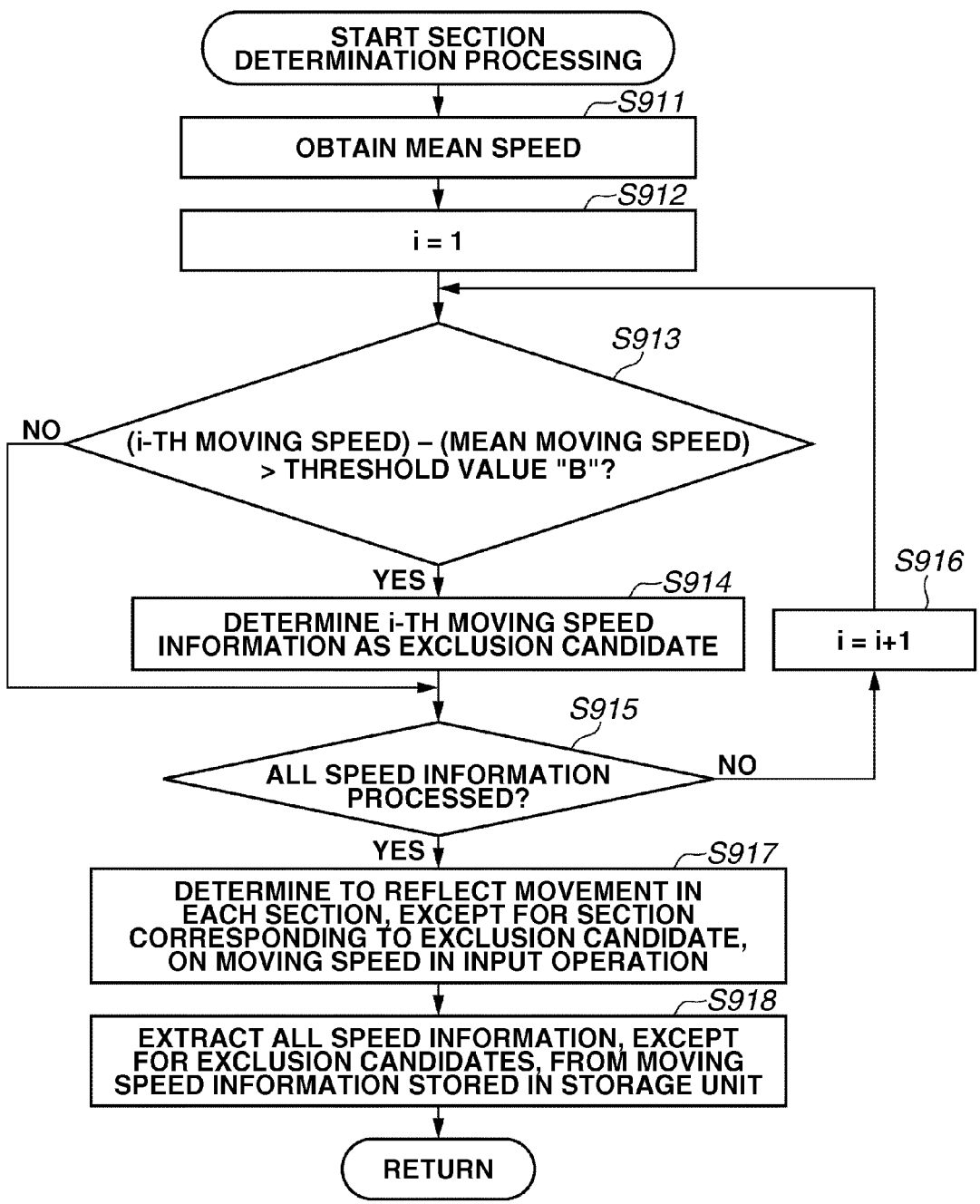

FIG. 9B is a flowchart illustrating an example of the moving speed extraction processing to be performed in step S205 according to the third exemplary embodiment.

First, in step S911, the first determination unit 114 acquires a mean speed of acquired moving speeds. More specifically, the first determination unit 114 obtains a sum of the plurality of pieces of moving speed information stored in the storage unit 113 and divides the obtained sum value by the number of the plurality of pieces of moving speed information. However, the mean value of moving speeds cannot be obtained based on the sum of the plurality of pieces of moving speed information when the time intervals of respective touch point detections are not constant. Therefore, it is useful to calculate a mean speed of the moving speeds with reference to a sum value of moving distances corresponding to the moving speeds stored in the storage unit 113 and a sum value of actually detected time intervals.

Next, in step S912, the first determination unit 114 sets the variable "i" to 1.

Next, in step S913, the first determination unit 114 determines whether a value obtainable by subtracting the mean speed acquired in step S911 from the moving speed value stored in the i-th storage area of the storage unit 113 is greater than a predetermined threshold value B. The threshold value B is usable to discriminate a moving speed of an operation object in a state where a user intentionally touches the touch panel from a large speed that is detectable when the operation object is released from the frictional engagement with the touch panel. More specifically, in the present exemplary embodiment, moving speeds are continuously acquired at predetermined time intervals and, if a moving speed is higher than the mean moving speed and a difference thereof is greater than the threshold value B, the first determination unit 114 determines that the moving speed is influenced by the frictional engagement between the operation object and the touch panel. If it is determined that the value obtainable by subtracting the mean moving speed from the i-th speed is greater than the threshold value B (YES in step S913), the operation proceeds to step S914. If it is determined the value obtainable by subtracting the mean moving speed from the i-th speed is equal to or smaller than the threshold value B (NO in step S913), the operation proceeds to step S915.

In step S914, the first determination unit 114 determines the i-th moving speed information as an exclusion candidate.

In step S915, the first determination unit 114 determines whether all of the plurality of pieces of moving speed information stored in the storage unit 113 has been completely processed. If it is determined that all of the speed information has been completely processed (YES in step S915), the operation proceeds to step S917. If it is determined that all of the speed information has not yet been completely processed (NO in step S915), the operation proceeds to step S916.

In step S916, the first determination unit 114 increments the variable "i" to "i+1" and repeats the processing of step S913.

In step S917, the first determination unit 114 determines to reflect the movement in the subsection corresponding to the moving speed designated as an exclusion candidate on the moving speed in the input operation. On the other hand, the first determination unit 114 determines to reflect the movement in the subsection corresponding to the moving speed not designated as an exclusion candidate on the moving speed in the input operation.

In step S918, the first determination unit 114 excludes all of the exclusion candidates from the plurality of pieces of moving speed information stored in the storage unit 113 and extracts the remaining moving speed information. Then, the operation returns to the processing of the flowchart illustrated in FIG. 2.

A table 1001 illustrated in FIG. 10B indicates information about respective touch points that have been detected when a flick operation has been performed as illustrated in FIGS. 4A, 4B, and 4C according to the third exemplary embodiment. The table 1001 includes x-coordinate value representing each touch point, moving distance between neighboring touch points, moving time required in movement between neighboring touch points, moving speed in a subsection between neighboring touch points, speed difference relative to the mean moving speed, and determination whether to exclude the moving speed. In this example, the threshold value B is 300 dot/s.

First, in step S911, the first determination unit 114 obtains a mean moving speed 1240 dot/s (=(750+850+2200+800+1600)/5) based on the plurality of pieces of moving speed information stored in the storage unit 113. In the present exemplary embodiment, the first determination unit 114 excludes moving speed information that is greater than the mean moving speed and the difference thereof is greater than 300 dot/s from the information to be used in the determination of the flick speed. Accordingly, as illustrated in the table 1001, the first determination unit 114 excludes 2200 dot/s (i.e., the moving speed in the subsection between the touch point 404 and the touch point 405) and 1600 dot/s (i.e., the moving speed in the subsection between the touch point 406 and the touch point 407) and extracts the remaining information. As a result, the second determination unit 115 determines a mean value of the extracted moving speeds (=800 dot/s) as flick speed.

As described above, even when the exclusion condition is "excluding a moving speed that is equal to or higher than a mean speed of the plurality of stored moving speeds if the difference thereof is greater than a predetermined threshold value", it is feasible to obtain an appropriate flick speed that is close to approximately 800 dot/s actually intended by a user. In such a case, it is feasible to simplify processing steps compared to the processing steps of the flowchart illustrated in FIG. 3.

In the third exemplary embodiment, to acquire the flick speed, it is useful to add another exclusion condition to exclude any speed that is lower than the mean speed if the difference thereof is greater than a predetermined threshold value. According to the above-mentioned example, it is feasible to prevent the flick speed from becoming lower than the value intended by a user because a low moving speed of an operation object, which is detectable immediately after the user starts an input operation, is not used in the determination of the flick speed. Further, similar to the first exemplary embodiment, it is useful to change the number of pieces of exclusion target speed information according to the number of pieces of acquired touch point (or moving speed) information. In this case, the number of exclusion targets can be set so as to enable the first determination unit 114 to refer to at least two pieces of information. The second determination unit 115 can secure the amount of information to be used in the determination of the flick speed. Thus, it is feasible to determine an appropriate flick speed.

In the third exemplary embodiment, all moving speeds that satisfy only one exclusion condition are designated as exclusion candidates and excluded from processing targets of the second determination unit 115. However, the present exemplary embodiment is not limited to the above-mentioned example. Although the first determination unit 114 in the above-mentioned exemplary embodiment excludes any moving speed that is higher than the mean speed and the difference thereof is greater than a predetermined threshold value, it is also useful to exclude any speed that is higher than the mean speed and the difference thereof is included in a predetermined range having an upper limit. According to the above-mentioned example, it is feasible to prevent any moving speed that is higher than the mean speed and the difference thereof does not exceed the upper limit of the predetermined range from being excluded. Thus, in a case where a user performs a flick operation at a higher speed, the moving speed is not excluded and an appropriate flick speed can be determined. Further, in a case where the mean speed obtained in step S911 is greater than a predetermined threshold value, it is useful to stop the moving speed extraction processing and extract all moving speeds stored in the storage unit 113. In this case, even when a user performs a flick operation at a higher speed, the moving speed is not excluded and an appropriate flick speed can be determined. The performance can be improved and power saving can be appropriately realized because the information processing apparatus does not perform the moving speed processing unnecessarily.

According to the present disclosure, it is feasible to improve user operability in a flick operation.

Embodiments of the present disclosure can also be realized by a computer of a system or apparatus that reads out and executes computer executable instructions recorded on a storage medium (e.g., a non-transitory computer-readable storage medium) to perform the functions of one or more of the above-described embodiment(s) of the present disclosure, and by a method performed by the computer of the system or apparatus by, for example, reading out and executing the computer executable instructions from the storage medium to perform the functions of one or more of the above-described embodiment(s). The computer may comprise one or more of a CPU, micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims priority from Japanese Patent Application No. 2012-201684 filed Sep. 13, 2012, which is hereby incorporated by reference herein in its entirety.

What is claimed is:

1. An information processing apparatus configured to move an image displayed on a display screen according to a flick operation, the information processing apparatus comprising:
    an acquisition unit configured to acquire information representing a moving speed of a touch point in each of a plurality of subsections that corresponds to between two consecutive points of a plurality of pieces of positional information detected from a start of one stroke to an end of the one stroke;
    a first determination unit configured to determine whether the moving speed of the touch point in each of the plurality of subsections is included in a predetermined speed range based on the information acquired by the acquisition unit, the predetermined speed range having both of a lower limit and an upper limit, and the first determination unit being further configured to select one or more subsections using a determination result to reflect the moving speed of the touch point in the selected subsections on a moving speed of the image displayed on the display screen; and
    a second determination unit configured to determine a moving speed of the image displayed on the display screen based on information representing the moving speed of the touch point in the one or more subsections selected by the first determination unit.

2. The information processing apparatus according to claim 1, further comprising:
    a display control unit configured to start scrolling the display image at the moving speed determined by the second determination unit, according to the flick operation, if the moving speed of the image displayed on the display screen determined by the second determination unit is higher than a predetermined reference speed.

3. The information processing apparatus according to claim 1, wherein the first determination unit determines whether the moving speed of the touch point in each of the plurality of subsections is included in a predetermined speed range based on information representing the moving speed of the touch point during a predetermined time before detection of the plurality of pieces of positional information by the information processing apparatus is ended.

4. The information processing apparatus according to claim 1,
    wherein the first determination unit is configured to select at least a plurality of subsections including all subsections, in which the first determination unit determines that the moving speed of the touch point is included in the predetermined speed range, and
    wherein the second determination unit determines the moving speed of the image displayed on the display screen based on touch point moving speeds in the at least a plurality of subsections of the plurality of subsections.

5. The information processing apparatus according to claim 4,
    wherein the first determination unit is configured to not select a predetermined number of subsections from subsections in which the moving speed of the touch point is not included in the predetermined speed range in a case where a number of subsections in which the information representing the moving speed of the touch point is acquired by the acquisition unit is less than three, and
    wherein the second determination unit is configured to determine the mean value of the moving speeds of the touch point in the subsections selected by the first determination unit as the moving speed of the image displayed on the display screen.

6. The information processing apparatus according to claim 5, further comprising:
    a measuring unit configured to measure a number of pieces of the information representing the moving speed of the touch point relating to the sequential movement from a start of the one stroke to an end of the one stroke acquired by the acquisition unit; and
    a changing unit configured to change a number of subsections, which are not selected from the plurality of subsections by the first determination unit.

7. The information processing apparatus according to claim 1, wherein the first determination unit does not select a predetermined number of subsections corresponding to higher moving speeds among the subsections in which the moving speed of the touch point is included in the predetermined speed range.

8. The information processing apparatus according to claim 1, wherein the first determination unit does not select a subsection in which the moving speed of the touch point is lower than a mean value of moving speeds of the touch point in all of the plurality of subsections by a threshold value.

9. The information processing apparatus according to claim 1,
    wherein the first determination unit is configured to select at least all subsections in which the moving speed of the touch point is not included in the predetermined speed range.

10. An information processing apparatus operable in response to a flick operation, the information processing apparatus comprising:
    a detection unit configured to detect a plurality of pieces of positional information about a movement of a touch point in the flick operation, the positional information being detected from a start of one stroke to an end of the one stroke;
    a first determination unit configured to determine whether a moving speed of the touch point in each of a plurality of subsections that corresponds to between two consecutive points of the plurality of pieces of positional information detected by the detection unit is included in a predetermined speed range, the predetermined speed range having both of a lower limit and an upper limit, and the first determination unit being further configured to select at least one subsection of a plurality of subsections using a determination result to reflect the moving speed of the touch point in the selected subsections on a response speed corresponding to the flick operation; and a second determination unit configured to determine the response speed corresponding to the flick operation based on information representing the moving speed of the touch point in the at least one subsection selected by the first determination unit, wherein the first determination unit selects at least all subsections in which the moving speed of the touch point is not included in a predetermined speed range.

11. An information processing apparatus operable in response to a flick operation, the information processing apparatus comprising:

a detection unit configured to detect a plurality of pieces of positional information about a movement of a touch point in the flick operation, the positional information being detected from a start of one stroke to an end of the one stroke;

an acquisition unit configured to acquire information representing a moving speed of the touch point in each of a plurality of subsections that corresponds to between two consecutive points of the plurality of pieces of positional information detected by the detection unit; and a determination unit configured to determine a response speed corresponding to the flick operation based on information representing the moving speed of the touch point in subsections remaining after a predetermined number of subsections in which the moving speed of the touch point is included in a predetermined speed range is excluded from the plurality of subsections, wherein the determination unit changes the number of subsections excluded from the plurality of subsections according to a number of pieces of information representing the moving speed of the touch point acquired by the acquisition unit.

\* \* \* \* \*